United States Patent
Hsieh et al.

(10) Patent No.: US 11,892,407 B2
(45) Date of Patent: Feb. 6, 2024

(54) DETECTION DEVICE AND DETECTION METHOD

(71) Applicant: Wistron Corporation, New Taipei (TW)

(72) Inventors: Yi Fan Hsieh, New Taipei (TW); Yu-Lin Chen, New Taipei (TW); Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 174 days.

(21) Appl. No.: 17/029,029

(22) Filed: Sep. 22, 2020

(65) Prior Publication Data
US 2021/0349029 A1  Nov. 11, 2021

(30) Foreign Application Priority Data
May 7, 2020  (TW) ................................. 109115198

(51) Int. Cl.
*G01N 21/64* (2006.01)
*G01N 37/00* (2006.01)
(Continued)

(52) U.S. Cl.
CPC ............ *G01N 21/6486* (2013.01); *B01L 7/52* (2013.01); *B01L 2300/18* (2013.01); *G01N 2201/0636* (2013.01)

(58) Field of Classification Search
CPC . B01L 2300/18; B01L 7/52; G01J 3/26; G01J 3/4406; G01N 2021/6419;
(Continued)

(56) References Cited

U.S. PATENT DOCUMENTS 7,710,632 B2  5/2010  Cummings
8,054,528 B2  11/2011 Cummings
(Continued)

FOREIGN PATENT DOCUMENTS

CN  102329725  1/2012
CN  102576150  7/2012
(Continued)

OTHER PUBLICATIONS

"Search Report of Europe Counterpart Application", dated Jun. 9, 2021, pp. 1-7.
(Continued)

*Primary Examiner* — Lydia Edwards
(74) *Attorney, Agent, or Firm* — JCIPRNET

(57) ABSTRACT

A detection device, including a light-emitting component, a light-detecting component, at least one reflective optical film element, and a control unit, is provided. The light-emitting component is used for providing an excitation beam, wherein a part of the excitation beam whose dominant wavelength falls within an excitation wavelength band generates a fluorescence beam after passing through a test specimen. The light-detecting component is used for receiving a part of the fluorescence beam whose dominant wavelength falls within a detection wavelength band. The control unit is coupled to the at least one reflective optical film element. The control unit controls the at least one reflective optical film element to filter out a part of a wavelength band of an incident beam. The incident beam is at least one of the excitation beam and the fluorescence beam. A detection method of the detection device is also provided.

6 Claims, 14 Drawing Sheets

(51) Int. Cl.
  *B01L 7/00* (2006.01)
  *B01L 99/00* (2010.01)
(58) Field of Classification Search
  CPC ......... G01N 2021/6471; G01N 21/645; G01N 21/6486; G01N 2201/0636
  See application file for complete search history.

(56) References Cited

U.S. PATENT DOCUMENTS

| | | |
|---|---|---|
| 8,437,070 B2 | 5/2013 | Cummings |
| 8,488,228 B2 | 7/2013 | Mienko et al. |
| 2005/0030545 A1 | 2/2005 | Tuschel et al. |
| 2006/0077512 A1 | 4/2006 | Cummings |
| 2006/0227320 A1* | 10/2006 | Tamiya ............... G01N 21/253 356/300 |
| 2010/0019157 A1 | 1/2010 | Furlan et al. |
| 2010/0245975 A1 | 9/2010 | Cummings |
| 2011/0075241 A1 | 3/2011 | Mienko et al. |
| 2011/0312102 A1 | 12/2011 | Jo |
| 2011/0317245 A1* | 12/2011 | Sampsell .................. G01J 3/26 359/290 |
| 2012/0026176 A1 | 2/2012 | Cummings |
| 2013/0301111 A1 | 11/2013 | Mienko et al. |
| 2014/0203167 A1* | 7/2014 | Poliakov ............... G06F 3/0421 250/227.14 |
| 2018/0120221 A1* | 5/2018 | Mohan ................. G02B 5/1814 |

FOREIGN PATENT DOCUMENTS

| | | |
|---|---|---|
| JP | 5775252 | 9/2015 |
| TW | 200627041 | 8/2006 |
| TW | I388914 | 3/2013 |

OTHER PUBLICATIONS

"Office Action of Taiwan Counterpart Application", dated Jan. 6, 2021, p. 1-p. 9.

"Office Action of Taiwan Counterpart Application", dated Sep. 10, 2021, p. 1-p. 15.

"Office Action of China Counterpart Application", dated May 27, 2023, p. 1-p. 9.

* cited by examiner

DETECTION DEVICE AND DETECTION METHOD

CROSS-REFERENCE TO RELATED APPLICATION

This application claims the priority benefit of Taiwan application serial no. 109115198 filed on May 7, 2020. The entirety of the above-mentioned patent application is hereby incorporated by reference herein and made a part of this specification.

BACKGROUND

Technical Field

The disclosure relates to a detection device and a detection method, and particularly to a detection device and a detection method applicable to photoluminescence.

Description of Related Art

Existing detection technology of fluorescent real-time polymerase chain reaction (real-time PCR)/quantitative polymerase chain reaction (qPCR) application mainly includes a temperature control part, a detection part, and an analysis part. In the temperature control part, a temperature control device is used to generate the required thermal cycles, so that the amount of the target analyte in a test specimen doubles after each thermal cycle, and the amount of the target analyte becomes 2 to the power of N times after N thermal cycles. In the detection part, an excitation beam whose dominant wavelength falls within a specific wavelength band, after irradiating the test specimen, generates a fluorescence beam whose dominant wavelength falls within another specific wavelength band. The fluorescence beam is then received by a light-detecting component, and the characteristics of the fluorescence beam are detected. In the analysis part, an analysis software is used to monitor the temperature change and fluorescence change of the entire polymerase chain reaction in real-time, so as to perform quantitative analysis on the test specimen.

Generally speaking, there are multiple fluorescent reagents for being added to the test specimens on the market, and each fluorescent reagent has its own suitable excitation spectrum. Therefore, a suitable optical bandpass filter is required to be disposed on the light path before the excitation beam passes through the test specimen according to the type of the fluorescent reagent, so that the required fluorescence beam is effectively formed when the fluorescent reagent in the test specimen is irradiated. In addition, since the signal of the fluorescence beam is generally very weak and easily covered by the signal of other noise light, a filter module having one or several bandpass filters is normally disposed on the light path, before the light-detecting component that receives the fluorescence beam whose dominant wavelength is within the said another specific wavelength band, so as to filter out the signal of noise light outside the said another specific wavelength band and to purify the characteristics of the fluorescence beam. In order to ensure detection accuracy, the optical density (OD) values of many bandpass filters are required to reach the OD 6 level, that is, the light passing rate of the cutoff wavelength band for each bandpass filter must be equal to or less than 10 to the power of negative 6 (−6).

On the other hand, existing detection devices on the market are disposed with multiple fluorescence channels to meet the requirements of multiple different fluorescent reagents when it is necessary to detect the test specimens that are added with different fluorescent reagents respectively. A fluorescence channel is the entire light path from the light source generating the excitation beam, through the test specimen forming the fluorescence beam (or the support frame that accommodates the test specimen and receives the excitation beam), to the light-detecting component receiving the fluorescence beam. Also, different filter modules having different bandpass filters need to be disposed on each fluorescence channel to meet the requirements of forming the excitation beam having a suitable excitation spectrum, and purifying the characteristics of the fluorescence beam.

Therefore, according to existing technologies, when a detection device is designed to simultaneously detect multiple different fluorescent reagents, causing the number of fluorescence channels to increase, the number of required bandpass filters must also increase, thereby greatly increasing the product costs. Moreover, when the detection device is disposed with multiple fluorescence channels, as the disposed light path system becomes more complicated, the device size becomes relatively huge and is difficult to be reduced. Also, high assembly complexity increases the costs of assembly and maintenance as well. In addition, when the fluorescent reagent in the test specimen is replaced or a new fluorescent reagent needs to be added, the light source of the excitation beam located on the fluorescence channel and all bandpass filters have to be replaced or added accordingly, therefore making it difficult to update the device and impossible to expand the functions.

SUMMARY

The disclosure provides a detection device, a detection method, and a polymerase chain reaction (PCR) system, which have good detection accuracy and low cost.

A detection device of the disclosure includes a light-emitting component, a light-detecting component, at least one reflective optical film element, and a control unit. The at least one reflective optical film element is disposed on a fluorescence channel between the light-emitting component and the light-detecting component. The control unit is coupled to the at least one reflective optical film element to control a wavelength band of a reflected light of the at least one reflective optical film element.

In an embodiment of the disclosure, each of the at least one reflective optical film element includes one or more reflective filter units.

In an embodiment of the disclosure, the one or more reflective filter units are a microelectromechanical system reflective filter unit.

In an embodiment of the disclosure, each of the one or more reflective filter units has a resonant cavity with a depth distance, and the depth distance is used for determining a wavelength band of a dominant wavelength of light reflected by the one or more reflective filter units.

In an embodiment of the disclosure, the at least one reflective optical film element includes a first reflective optical film element, and the one or more reflective filter units with the depth distance of the resonant cavity being of a first depth distance is disposed on the first reflective optical film element for reflecting an outgoing beam whose dominant wavelength falls within an excitation wavelength band and corresponds to the first depth distance.

In an embodiment of the disclosure, the at least one reflective optical film element includes a second reflective optical film element, and the one or more reflective filter units with the depth distance of the resonant cavity being of a second depth distance is disposed on the second reflective optical film element for reflecting an outgoing beam whose dominant wavelength falls within a detection wavelength band and corresponds to the second depth distance.

In an embodiment of the disclosure, the at least one reflective optical film element includes one or more filter regions, each of the one or more filter regions includes the one or more reflective filter units, where actuation depth distances of the resonant cavities of the one or more reflective filter units located in a same filter region are the same as each other, and actuation depth distances of the resonant cavities of the one or more reflective filter units located in different filter regions are different from each other.

In an embodiment of the disclosure, the one or more filter regions include a first filter region, and the one or more reflective filter units located in the first filter region is used for reflecting light whose dominant wavelength falls within an excitation wavelength band.

In an embodiment of the disclosure, the one or more filter regions include a second filter region, and a reflected light of the one or more reflective filter units located in the second filter region falls within a detection wavelength band under a control of the control unit.

In an embodiment of the disclosure, the detection device further includes an accommodating frame, for accommodating a test specimen and having an opening for receiving a part of the excitation beam whose dominant wavelength falls within the excitation wavelength band, and a hole for transmitting a fluorescence beam whose dominant wavelength falls within the detection wavelength band.

The detection method of the disclosure is applicable to a detection device. The detection device includes a light-emitting component, a light-detecting component, a control unit, and at least one reflective optical film element. The at least one reflective optical film element is located on a fluorescence channel between the light-emitting component and the light-detecting component, and the detection method includes the following steps. The light-emitting component provides an excitation beam, which is used for generating a fluorescence beam after irradiating a test specimen. The light-detecting component receives the fluorescence beam. The at least one reflective optical film element is used for filtering out a part of a wavelength band of an incident beam, and the incident beam is one of the excitation beam or the fluorescence beam. The control unit controls the at least one reflective optical film element to reflect light of a determined wavelength band.

In an embodiment of the disclosure, the at least one reflective optical film element includes one or more reflective filter units, wherein filtering out the part of the wavelength band of the incident beam using the at least one reflective optical film element is to filter out the part of the wavelength band of the incident beam by using the control unit to control the one or more reflective filter units.

In an embodiment of the disclosure, the one or more reflective filter units are a microelectromechanical system reflective filter unit, wherein filtering out the part of the wavelength band of the incident beam by using the control unit to control the one or more reflective filter units is to filter out the part of the wavelength band of the incident beam by using the control unit to control the microelectromechanical system reflective filter unit.

In an embodiment of the disclosure, the reflective filter unit has a resonant cavity, and the control unit controls a depth distance of the resonant cavity to reflect light having a dominant wavelength corresponding to the depth distance.

In an embodiment of the disclosure, when an excitation beam provided by the light-emitting component enters the at least one reflective optical film element, the control unit controls the depth distance of at least one of the resonant cavity of the one or more reflective filter units irradiated by the excitation beam to be a first depth distance, so that the dominant wavelength of the excitation beam reflected via the at least one reflective optical film element falls within an excitation wavelength band and corresponds to the first depth distance.

In an embodiment of the disclosure, when a fluorescence beam enters the at least one reflective optical film element, the control unit controls the depth distance of at least one of the resonant cavity of the one or more reflective filter units irradiated by the fluorescence beam to be a second depth distance, so that the dominant wavelength of the fluorescence beam reflected by the at least one reflective optical film element falls within a detection wavelength band and corresponds to the second depth distance.

In an embodiment of the disclosure, the detection method further includes the following steps. One or more filter regions are provided on the at least one reflective optical film element. Each of the one or more filter regions includes the one or more reflective filter units, where actuation depth distances of the resonant cavities of the one or more reflective filter units located in a same filter region are the same as each other, and actuation depth distances of the resonant cavities of the one or more reflective filter units located in different filter regions are different from each other.

In an embodiment of the disclosure, the one or more filter regions include a first filter region. The detection method further includes the following step. The one or more reflective filter units located in the first filter region are controlled by using the control unit, so that a dominant wavelength of the reflected light falls within an excitation wavelength band.

In an embodiment of the disclosure, the one or more filter regions include a second filter region. The detection method further includes the following step. The one or more reflective filter units located in the second filter region are controlled by using the control unit, so that a dominant wavelength of the reflected light falls within a detection wavelength band.

In an embodiment of the disclosure, the detection device further includes an accommodating frame, for accommodating a test specimen, and having an opening and a hole. The detection method further includes the following step. A light path is formed using the opening and the hole to constitute a fluorescence channel.

The PCR system of the disclosure includes the detection device, a temperature control module, and an analysis module. The temperature control module is used for controlling a temperature of the PCR system and includes a heating module. The analysis module is used for analyzing a signal from the light-detecting component.

In an embodiment of the disclosure, the at least one reflective optical film element includes a first reflective optical film element for reflecting an outgoing beam whose dominant wavelength falls within an excitation wavelength band and a second reflective optical film element for reflecting an outgoing beam whose dominant wavelength falls within a detection wavelength band.

In an embodiment of the disclosure, each of the at least one reflective optical film element includes one or more reflective filter units. Each of the one or more reflective filter units has a resonant cavity with a depth distance, and the depth distance is used for determining a wavelength band of a dominant wavelength of light reflected by the one or more reflective filter units.

In an embodiment of the disclosure, the detection device further includes an accommodating frame, for accommodating a test specimen and having an opening for receiving a part of an excitation beam whose dominant wavelength falls within an excitation wavelength band, and a hole for transmitting a fluorescence beam whose dominant wavelength falls within the detection wavelength band.

In an embodiment of the disclosure, the temperature control module further includes a temperature sensor and a heat dissipation module.

Based on the above, the detection device and the detection method of the disclosure perform fluorescence detection by the provision of the at least one reflective optical film element. According to an embodiment of the disclosure, only the at least one reflective optical film element is required and a filter module constituted by bandpass filters is not required to perform the fluorescence detection, and the equipment can be easily updated and expanded. According to another embodiment of the disclosure, the detection of the test specimen having multiple different fluorescent reagents can be supported using the same light path or fluorescence channel, so the light path can be simplified and the complexity of the device can be reduced.

DESCRIPTION OF THE EMBODIMENTS

Figure 1:
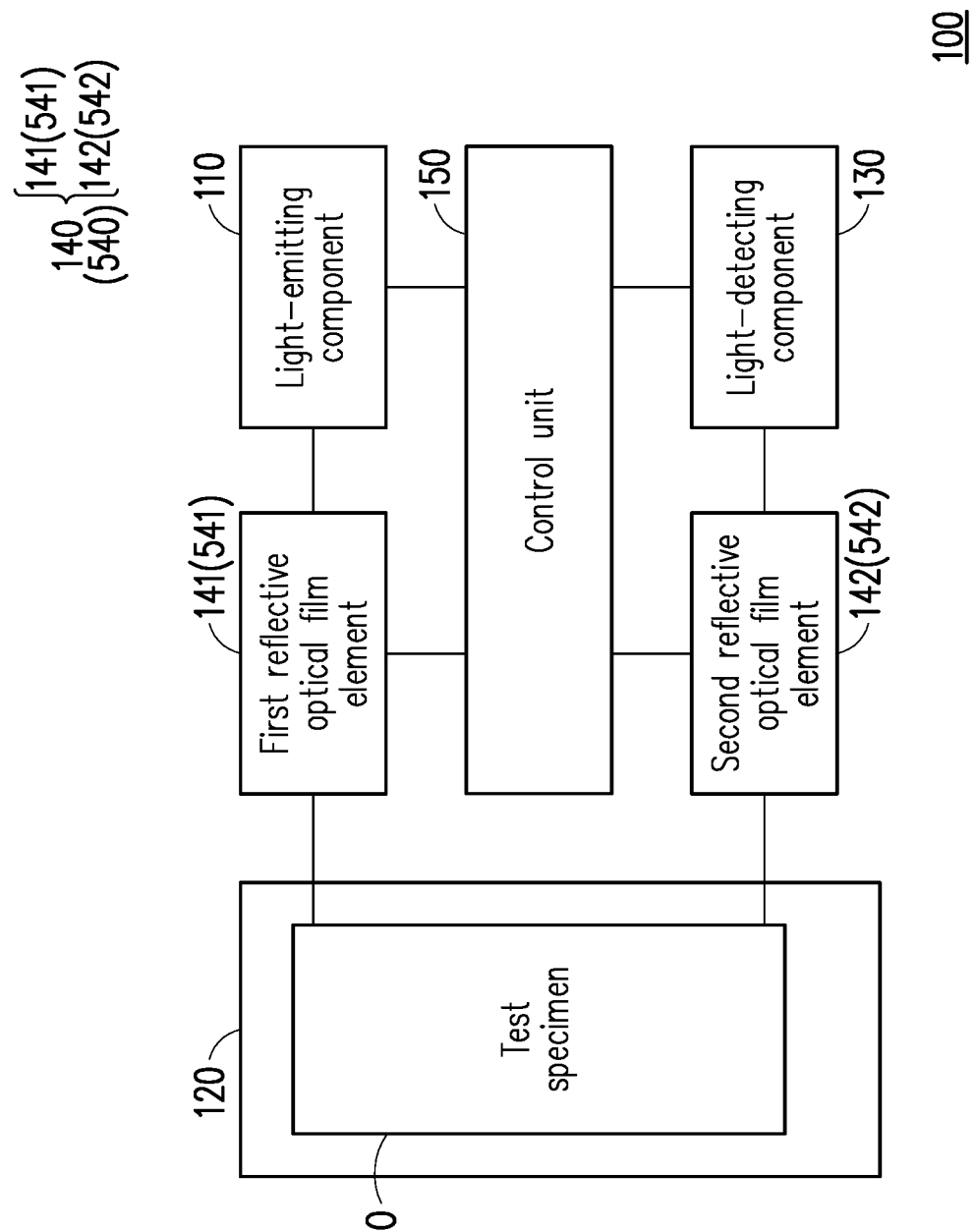
FIG. 1 is a block diagram of a system of a detection device according to an embodiment of the disclosure.
Figure 2:
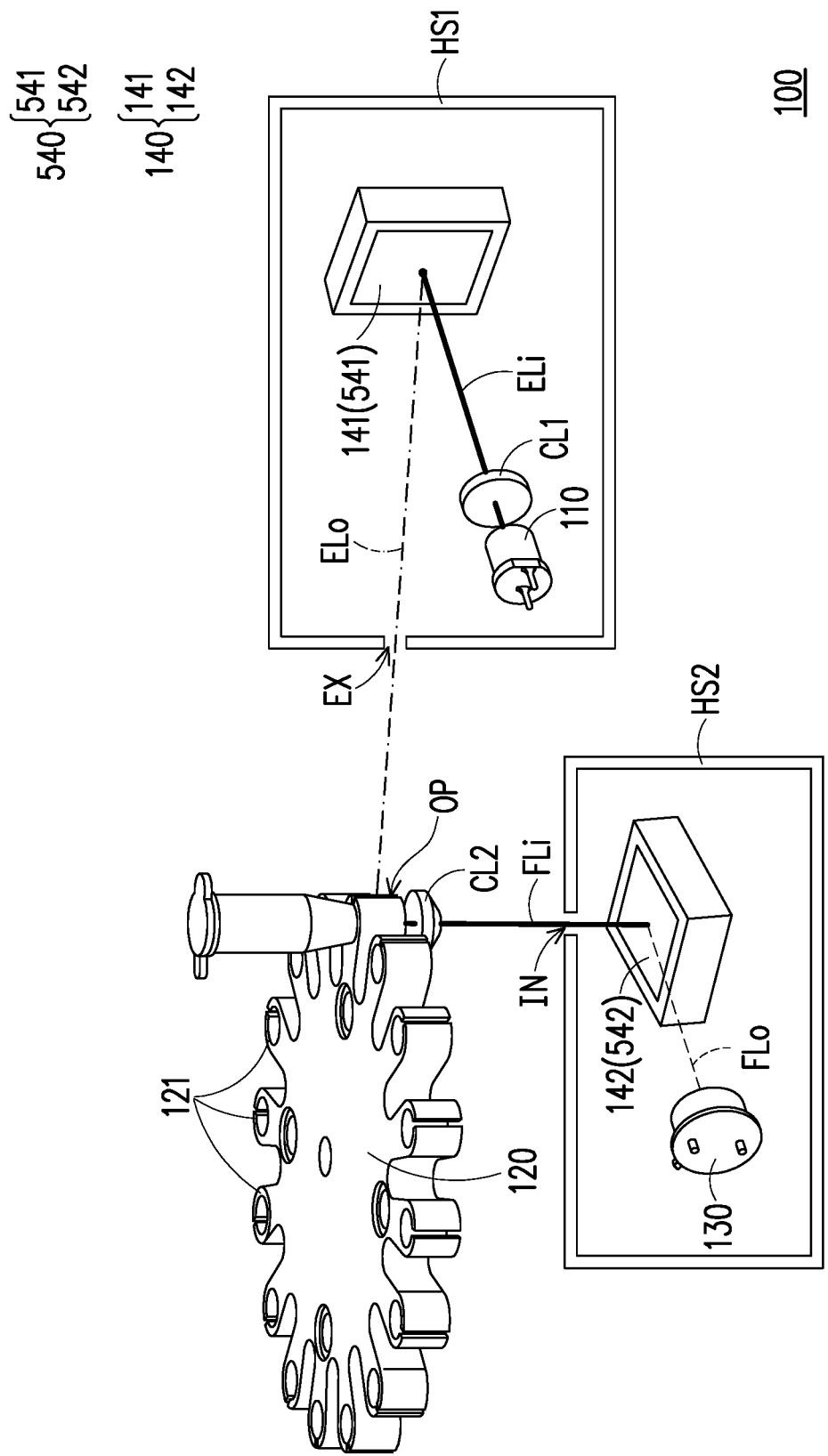
FIG. 2 is a schematic view of a structure of the detection device shown in FIG. 1.
Figure 3A:
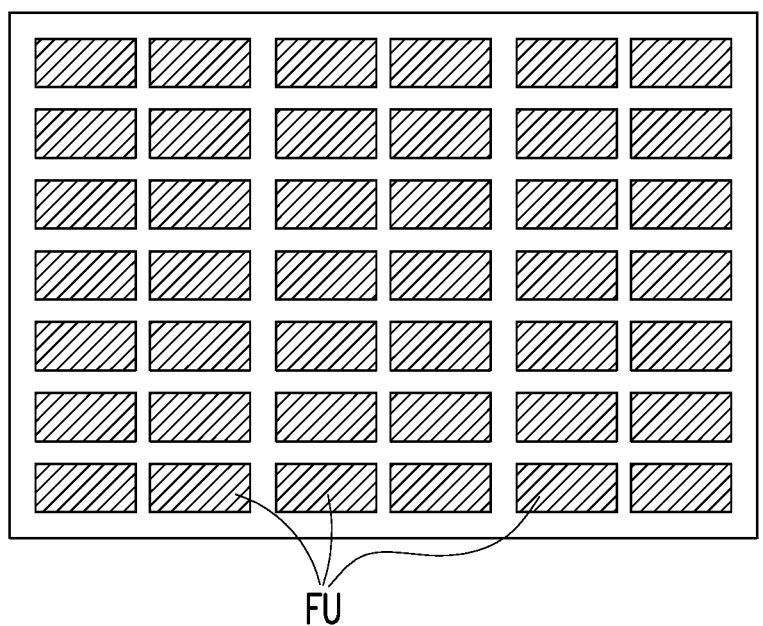
FIG. 3A is a schematic front view of an embodiment of a reflective optical film element shown in FIG. 2.
Figure 3B:
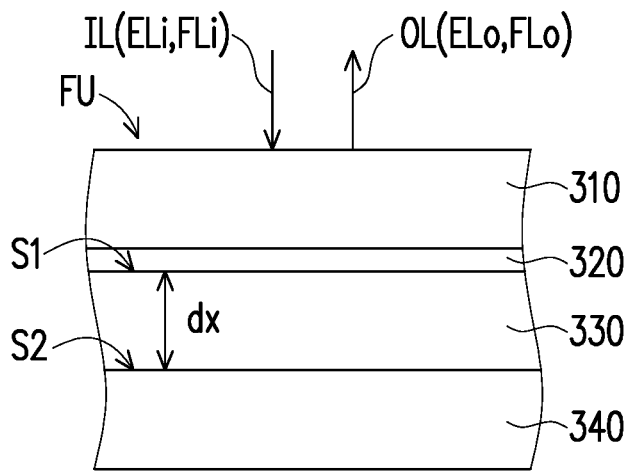
FIG. 3B is a schematic view of a light path when an incident beam perpendicularly enters an embodiment of a reflective filter unit of the reflective optical film element shown in FIG. 3A.
Figure 3C:
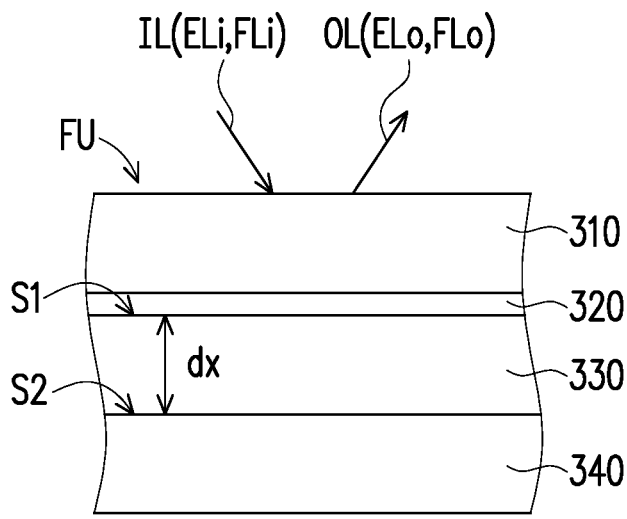
FIG. 3C is a schematic view of a light path when an incident beam obliquely enters the reflective filter unit shown in FIG. 3B.
Figure 3D:
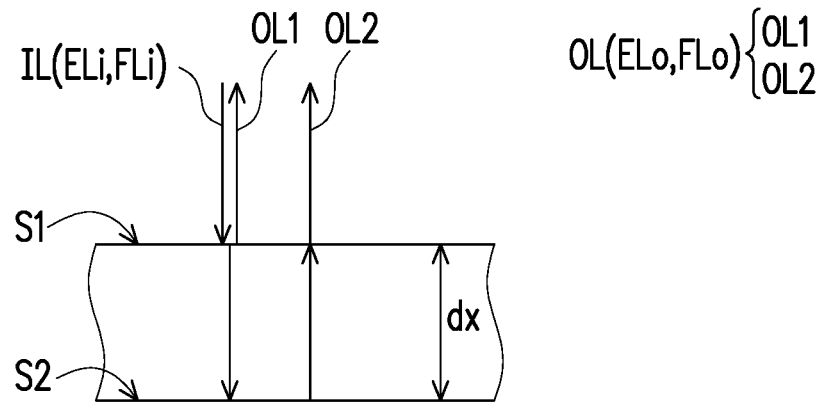
FIG. 3D to FIG. 3F are schematic views of a working principle illustration of a reflective optical film element.
Figure 3E:
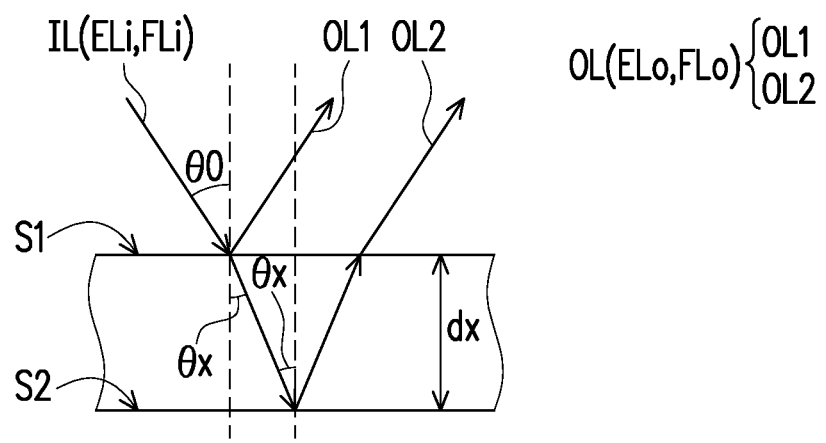
Figure 3F:
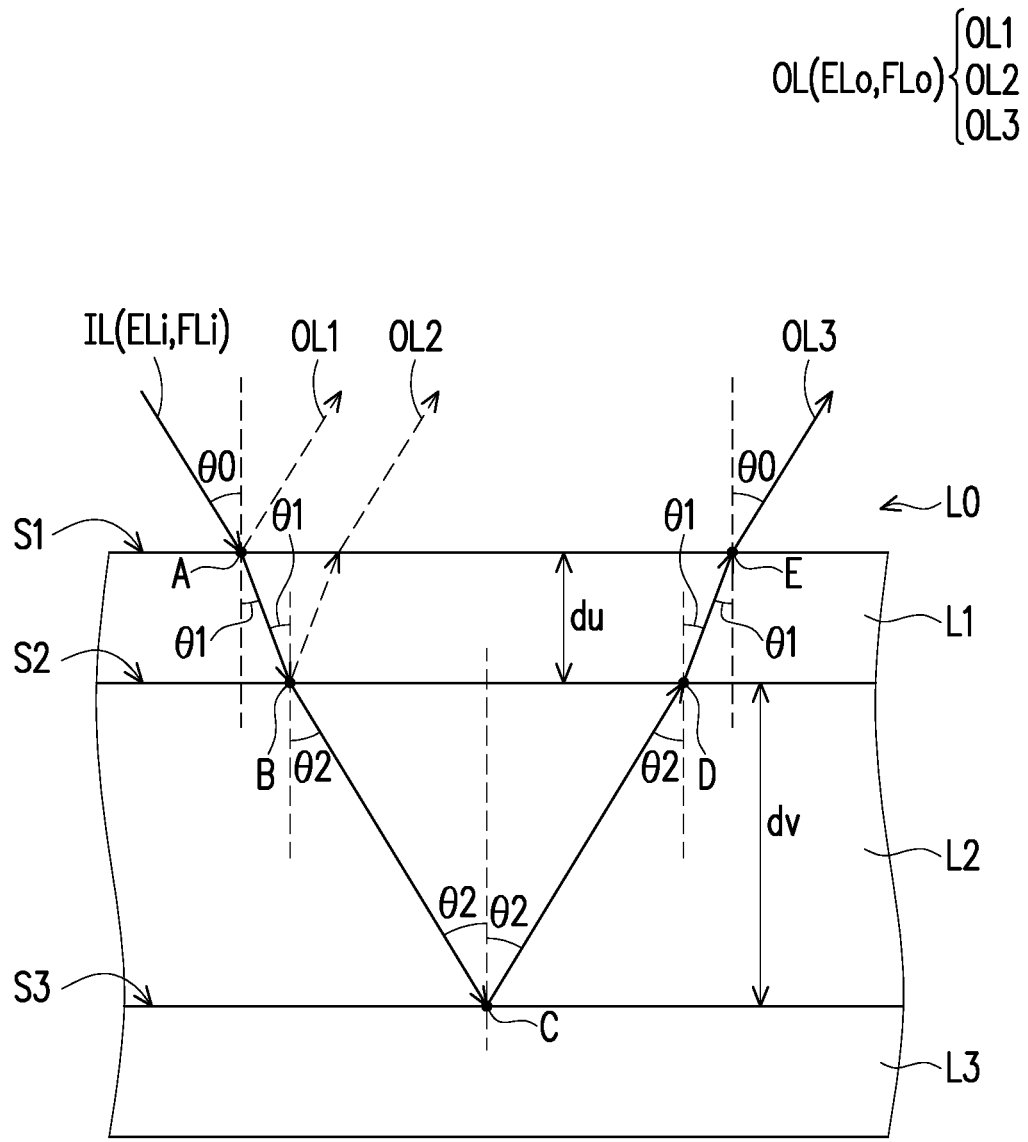
Figure 3G:
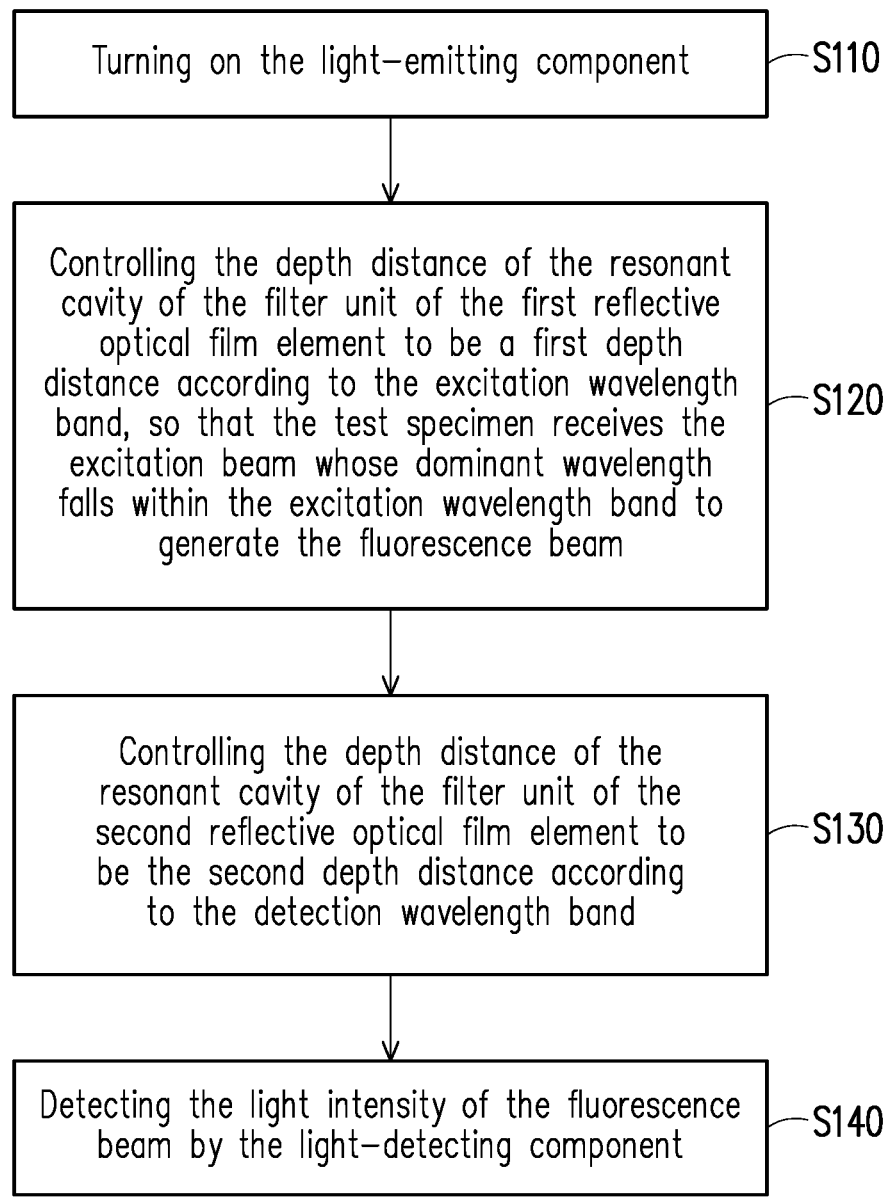
FIG. 3G is a flowchart of a detection method when the reflective optical film element shown in FIG. 3A is used.
Figure 4A:
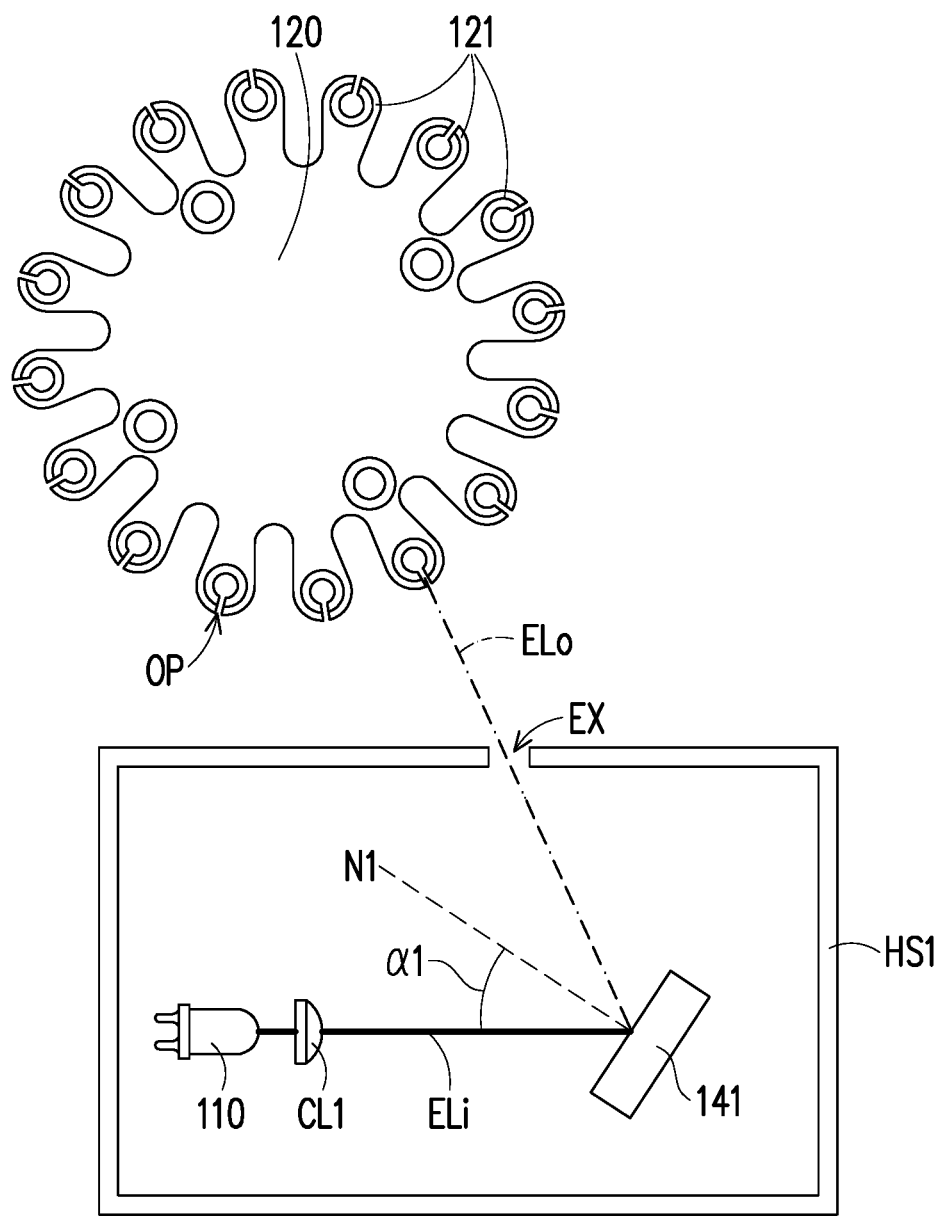
FIG. 4A is a schematic view of a light path of the detection device shown in FIG. 2 when the incident beam is an excitation beam.
Figure 4B:
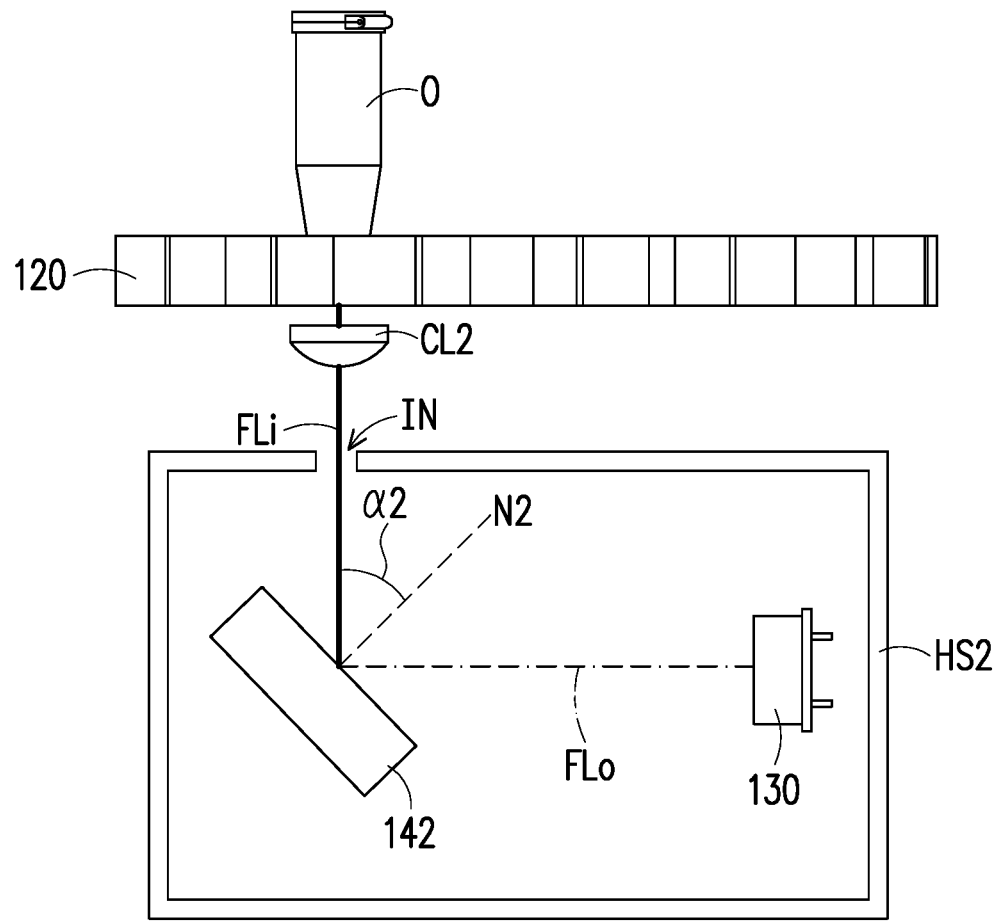
FIG. 4B is a schematic view of the light path of the detection device shown in FIG. 2 when the incident beam is a fluorescence beam.
Figure 4C:
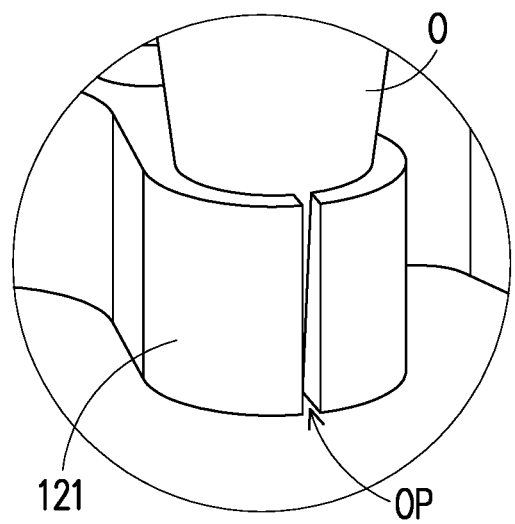
FIG. 4C is a partially enlarged schematic view of a sleeve structure shown in FIG. 4A.
Figure 4D:
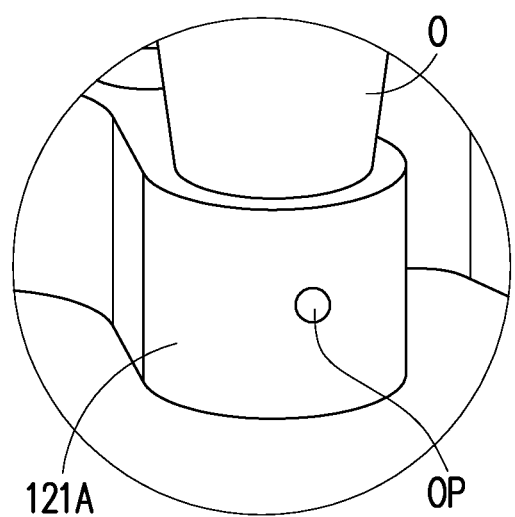
FIG. 4D is a partially enlarged schematic view of another sleeve structure shown in FIG. 4A.

FIG. 1 is a block diagram of a system of a detection device according to an embodiment of the disclosure. FIG. 2 is a schematic view of a structure of the detection device shown in FIG. 1. FIG. 3A is a schematic front view of an embodiment of a reflective optical film element shown in FIG. 2. FIG. 3B is a schematic view of a light path when an incident beam perpendicularly enters an embodiment of a reflective filter unit of the reflective optical film element shown in FIG. 3A. FIG. 3C is a schematic view of a light path when an incident beam obliquely enters a reflective filter unit FU shown in FIG. 3B. FIG. 3D to FIG. 3F are schematic views of a working principle illustration of a reflective optical film element. FIG. 3G is a flowchart of a detection method when the reflective optical film element shown in FIG. 3A is used. FIG. 4A is a schematic view of a light path of the detection device shown in FIG. 2 when the incident beam is an excitation beam. FIG. 4B is a schematic view of the light path of the detection device shown in FIG. 2 when the incident beam is a fluorescence beam. FIG. 4C is a partially enlarged schematic view of a sleeve structure shown in FIG. 4A. FIG. 4D is a partially enlarged schematic view of another sleeve structure shown in FIG. 4A. Referring to an embodiment of the disclosure in FIG. 1 and FIG. 2, a detection device 100 of the embodiment includes a light-emitting component 110, an accommodating frame 120, a light-detecting component 130, a control unit 150, and at least one reflective optical film element 140. The at least one reflective optical film element 140 includes a first reflective optical film element 141 and a second reflective optical film element 142. In addition, a fluorescence channel of the detection device 100 in the embodiment is constituted by the light path of an excitation beam ELi from the light-emitting component 110 to the first reflective optical film element 141, the light path of an excitation beam ELo from the first reflective optical film element 141 to (a test specimen O of) the accommodating frame 120, the light path of a fluorescence beam FLi from (the test specimen O of) the accommodating frame 120 to the second reflective optical film element 142, and the light path of a fluorescence beam FLo from the second reflective optical film element 142 to the light-detecting component 130.

According to an embodiment of the disclosure, the light-emitting component 110 is used for providing the excitation beam ELi. For example, the light-emitting component 110 may be a light emitting diode emitting white light, which is used for providing the excitation beam ELi having a light-emitting wavelength between about 400 nm and about 700 nm. On the other hand, the light-emitting component 110 may be an ultraviolet light emitting diode, and the light-emitting wavelength band provided thereby includes at least a part of the ultraviolet light wavelength band. Similarly, the light-emitting component 110 may be a light source including visible light and ultraviolet light, and the light-emitting wavelength band provided thereby includes at least the wavelength bands of visible light and ultraviolet light.

The accommodating frame 120 of the embodiment is used for accommodating the test specimen O. According to an embodiment of the disclosure shown in FIG. 2, the accommodating frame 120 has at least one sleeve structure 121, wherein the at least one sleeve structure 121 is used for accommodating the test specimen O. For example, as shown in FIG. 2, the test specimen O having a fluorescent reagent is placed in one of the sleeve structures 121. When the suitable excitation spectrum of the fluorescent reagent falls within the excitation wavelength band, that is, when the test specimen O is irradiated by a part of the excitation beam ELo whose dominant wavelength falls within the excitation wavelength band, the fluorescent reagent in the test specimen O may generate the fluorescence beam FLi.

According to an embodiment of the disclosure, as shown in FIGS. 2 and 3A to 3C, the at least one reflective optical film element 140 may filter out a part of the wavelength band of an incident beam IL using the interference effect of light when light enters to form and reflect an outgoing beam OL whose dominant wavelength falls within a specific wavelength band. According to an embodiment of the disclosure, the at least one reflective optical film element 140 includes the first reflective optical film element 141 and/or the second reflective optical film element 142. The first reflective optical film element 141 and/or the second reflective optical film element 142 may be a reflective optical film element of a microelectromechanical system (MEMS), which can reflect the incident beam IL having a specific wavelength under the control of the control unit 150. According to an embodiment of the disclosure, the reflective optical film element 140 is a MEMS reflective optical film element 140, which may reflect light having a specific wavelength in the incident beam IL to become the outgoing beam OL under the control of the control unit 150. According to an embodiment of the disclosure, the MEMS reflective optical film element 140 has one or more filter units FU, which may reflect light having a specific wavelength in the incident beam IL to become the outgoing beam OL under the control of the control unit 150. According to an embodiment of the disclosure, each filter unit FU has an optical resonant cavity. The optical resonant cavity has a depth distance dx of the resonant cavity. Light having a specific wavelength in the incident beam IL is reflected to become the outgoing beam OL when the depth distance dx is controlled by the control unit 150. According to another embodiment of the disclosure, the filter unit FU of the MEMS reflective optical film element 140 is an interferometric modulator display (IMOD), which is a Mirasol Display developed by Qualcomm, which is a reflective mirror layer disposed with a thin absorbing layer thereon to control the depth distance of the optical resonant cavity therebetween, so as to reflect light having a specific wavelength within the incident beam IL to become the outgoing beam OL (FIGS. 3B and 3C). According to another embodiment of the disclosure, the filter unit FU of the MEMS reflective optical film element 140 may be multiple groups of different filter units FU1, FU2, and FU3, in which each reflects the incident beam IL of different specific wavelength to become the outgoing beam OL (FIG. 5B) under the control of the control unit 150.

According to an embodiment of the disclosure, as shown in FIGS. 3A to 3C, the first reflective optical film element 141 and the second reflective optical film element 142 respectively includes multiple filter units FU. Each filter unit FU respectively has a first interface S1 and a second interface S2. The optical resonant cavity of each filter unit FU is formed between the first interface S1 and the second interface S2 of each filter unit FU. The distance between the first interface S1 and the second interface S2 is defined as the depth distance dx of the resonant cavity of each filter unit FU. According to an embodiment of the disclosure, as shown in FIGS. 3A to 3C, the first reflective optical film element 141 and the second reflective optical film element 142 respectively includes multiple filter units FU. The structure of the filter unit FU may be implemented by using MEMS technology, wherein an anti-reflection layer 310 is provided at the top, an absorption layer 320 is provided under the anti-reflection layer 310, a mirror layer 340 is further provided at a distance from the absorption layer 320, and the space between the absorption layer 320 and the mirror layer 340 forms a resonant cavity 330. The optical resonant cavity 330 is filled with air, other gases, or other materials. The distance dx between the absorption layer 320 and the mirror layer 340 is defined as the depth distance of the resonant cavity. Modulation is done by the control unit 150 controlling the depth distance dx to reflect light having a specific wavelength in the incident beam IL to become the outgoing beam OL.

The following is a brief introduction to the working principle of a reflective optical film element. With reference to FIG. 3D, according to the optical interference principle of film, when light enters a denser medium from a less dense medium and is reflected, the phase of light is changed by 180 degrees. However, when light enters a less dense medium from a denser medium and is reflected, no phase change is observed. Therefore, when the incident beam IL enters the film (resonant cavity) perpendicularly from the interface S1, when a light path difference (OPD) between an outgoing beam OL1 that exits the film after being perpendicularly reflected via the first interface S1 and an outgoing beam OL2 that transmits to leave the film from the interface S1 after being perpendicularly reflected via the second interface S2 conforms to half of a wavelength $\lambda$ more than an integer multiple of the wavelength $\lambda$, that is: $OPD=(\lambda m-\lambda/2)$, where m is a positive integer 1, 2, 3 . . . , then the outgoing beam OL1 and the outgoing beam OL2 respectively reflected via the first interface S1 and the second interface S2 will have the same phase to generate constructive interference, and the intensity of the total beam OL increases significantly. The OPD equals to the product of twice the film thickness dx and the optical film refractive index nx: $OPD=2(dx)*(nx)=2(nx)(dx)$. However, when the wavelength of the incident beam IL does not conform to the above situation, the incident beam IL cannot be substantially reflected by the film. In other words, the thickness of the optical film may determine the wavelength of the outgoing beam OL which can be substantially reflected. For example, when m=1 is selected, $OPD=\lambda/2$, and the thickness of the optical film and the constructive interference of the outgoing beam OL may be determined by the following relationship: $\lambda=4(nx)(dx)$.

Referring to FIG. 3E, when the external incident beam IL does not enter the film perpendicularly and has an incident angle $\theta 0$, the OPD between the outgoing beam OL1 and the outgoing beam OL2 respectively reflected via the first interface S1 and the second interface S2 has to take into consideration the relationship between parameters such as a refractive index n0 of the external medium, a refractive index nx of the medium in the resonant cavity, the incident angle $\theta 0$ and the refraction angle $\theta x$ of the incident beam IL entering the resonant cavity, and also takes into consideration that when the refractive index n0 is approximately equal to 1 when the external is vacuum or air the OPD conforms to the following equation: $OPD=2(nx)(dx)\cos(\theta x)$, where $\cos(\theta x)$ may be calculated using $\sin(\theta x)=(n0)\sin(\theta 0)/(nx)=\sin(\theta 0)/(nx)$ (according to Snell's law). When further considering the constructive interference, $OPD=(\lambda m-\lambda/2)$, where m is a positive integer 1, 2, 3 . . . , therefore, the constructive interference of the light of the wavelength $\lambda$ is achieved by controlling dx. For example, when m=1 is selected, $OPD=\lambda/2$, and the relationship between the film thickness dx and the wavelength $\lambda$ of the outgoing beam OL may be determined by the following equation: $\lambda=4(nx)(dx)\cos(\theta x)$, where $\sin(\theta x)=\sin(\theta 0)/(nx)$, and nx is known from the medium material, so when the incident angle $\theta 0$ is determined, the refraction angle $\theta x$ may be obtained, so as to calculate $\cos(\theta x)$. Furthermore, to obtain the outgoing beam OL having the required value of the wavelength $\lambda$, the thickness dx is controlled via the above equation based on the required value of the wavelength $\lambda$.

With reference to FIG. 3F, the scenario of more layers of films is further considered, wherein the refractive indices of an external medium layer L0, a first medium layer L1, a second medium layer L2, and a third medium layer L3, from top to bottom, are n0, n1, n2, and n3 respectively, and n0<n1, n2<n1, and n2<n3. The external medium layer L0 is, for example, the external ambient environment (such as air or vacuum), the first medium layer L1 is, for example, an optical film, the second medium layer L2 is, for example, an optical film or a cavity (for example, filled with air or vacuum therein), and the third medium layer L3 is, for example, an optical film or a mirror (such as a total reflection mirror). From top to bottom, the medium layers are an optically less dense medium, an optically denser medium, an optically less dense medium, and an optically denser medium respectively. When the external incident beam IL does not enter the film perpendicularly and has an incident angle, assuming that the incident angle is the incident angle $\theta 0$, the refraction angle when passing through the first interface S1 (between the external medium layer L0 and the first medium layer L1) at a point A is a first included angle $\theta 1$, and the refraction angle when passing through the second interface S2 (between the first medium layer L1 and the second medium layer L2) at a point B is a second included angle $\theta 2$. When the beam encounters the third interface S3 (between the second medium layer L2 and the third medium layer L3) at a point C, only the upward reflection is considered, that is, the part that reflects upward and directly passes through a point D of the second interface S2 and a point E of the first interface S1. The first medium layer L1 has a thickness du and the second medium layer L2 has a thickness dv, therefore, the OPD of an outgoing beam OL3 with respect to the outgoing beam OL1 is OPD=2(n1)(du)cos($\theta 1$)+2(n2)(dv)cos($\theta 2$), where (n0)sin($\theta 0$)=(n1)sin($\theta 1$)=(n2)sin($\theta 2$) (according to Snell's law). In addition, considering that n0<n1 and n2<n3, so light reflected at both the first interface S1 and the third interface S3 have a phase change of 180 degrees. Therefore, since during the constructive interference, the OPD=$\lambda$m, where m is a positive integer 1, 2, 3 . . . , the constructive interference of light of the wavelength of $\lambda$ may be achieved by controlling the depth distance. The resultant equation of the outgoing beam OL2 is obtained in FIG. 3E. The outgoing beam OL takes into consideration of the total interference effect of the sum of the outgoing beam OL1, the outgoing beam OL2, the outgoing beam OL3, and other reflected light. When the number of layers of the optical film is further increased, the corresponding OPD equation may be easily inferred from the foregoing, so there will be no reiteration here. When multiple layers of films are stacked, the optical properties thereof may be further configured to enhance the constructive interference effect of light of the wavelength $\lambda$, thereby achieving the objective of wavelength selection. Based on the optical interference principle of film, if the optical film is regarded as an optical resonant cavity and the thickness of the optical film element is regarded as the depth distance of the resonant cavity, the depth distance of the resonant cavity may be adjusted to select the desired dominant wavelength band of the reflected light.

As shown in FIGS. 2 and 3A to 3B, in the embodiment, the incident beam IL may be the excitation beam ELi and/or the fluorescence beam FLi, and the corresponding outgoing beam OL is respectively the excitation beam ELo and/or the fluorescence beam FLo. Further, as shown in FIGS. 2 and 4A, when the incident beam IL is the excitation beam ELi, the at least one reflective optical film element 140 includes the first reflective optical film element 141. The first reflective optical film element 141 is located on the transmission path of the excitation beam ELi and is located between the light-emitting component 110 and the accommodating frame 120. In other words, when the incident beam IL is the excitation beam ELi, it is the case where the excitation beam ELi enters the first reflective optical film element 141. When the excitation beam ELi passes through the first optical film element 141, the depth distance dx of the resonant cavity of each filter unit FU of the first reflective optical film element 141 may be controlled to form the excitation beam ELo whose dominant wavelength falls within the excitation wavelength band. Furthermore, as shown in FIG. 2, in the embodiment, the detection device 100 further includes a first housing HS1 to form a first darkroom for accommodating the light-emitting component 110 and the first reflective optical film element 141, so as to isolate external noise light and to facilitate fluorescence detection. In addition, the first housing HS1 has an exit EX for providing the excitation beam ELo whose dominant wavelength falls within the excitation wavelength band to pass through. According to an embodiment of the disclosure, the detection device 100 is provided with at least one darkroom to accommodate the test specimen O, so as to isolate external noise light and facilitate fluorescence detection. According to another embodiment of the disclosure, the test specimen O is placed in a dark room and is supported by the accommodating frame 120 to isolate external noise light. However, the dark room has an opening allowing the test specimen O to receive the excitation beam ELo and a hole allowing the test specimen O to send the fluorescence beam FLi.

In more detail, as shown in FIGS. 2 and 4A, since the position of the light-emitting component 110, the incident direction of the excitation beam ELi, and the position of the test specimen O are all fixed, a normal direction N1 of the first reflective optical film element 141 and, a first incident angle $\alpha 1$ between the excitation beam ELi and the normal direction N1 will also be kept at a fixed value. Therefore, as long as the exit EX of the first housing HS1 is disposed as a small opening on the transmission path of the excitation beam ELo, the excitation beam ELo may pass through the exit EX and enter the test specimen O. According to an embodiment of the disclosure, the inside of the first housing HS1 uses a light absorbing substance of a black material or a material coated with black paint to reduce the possibility of the excitation beam ELi reflecting via the internal structure of the first housing HS1 to pass through the exit EX of the first housing HS1, thereby further filtering out the influence of noise light.

Next, as shown in FIGS. 2 and 4C, according to an embodiment of the disclosure, at least one sleeve structure 121 is located on the transmission path of the excitation beam ELo. In the embodiment, each of the at least one sleeve structure 121 has an opening OP. The excitation beam ELo whose dominant wavelength falls within the excitation wavelength band will align with the opening OP after passing through the exit EX of the first housing HS1, so that the opening OP may be used for receiving the excitation beam ELo. For example, the width of the opening OP may be between about 0.5 mm and 1 mm to reduce the possibility of ambient noise light passing through the opening OP, and maintain the maximum value of the excitation beam ELo receivable by the opening OP. In addition, in the embodiment, the shape of the opening OP may be a slit, but the disclosure is not limited thereto. In other embodiments, the shape of the opening OP may also be a circular opening OP (such as the opening OP of a sleeve structure 121A of the embodiment in FIG. 4D), or a rectangular opening OP, and so on.

On the other hand, as shown in FIGS. 2 and 4B, when the incident beam IL is the fluorescence beam FLi, the at least one reflective optical film element 140 includes the second reflective optical film element 142. The second reflective optical film element 142 is located on the transmission path of the fluorescence beam FLi and is located between the accommodating frame 120 and the light-detecting component 130. Moreover, each of the at least one sleeve structures 121 is further provided with a hole underneath for the emergence of the fluorescence beam FLi generated by a part of the excitation beam ELo whose dominant wavelength falls within the excitation wavelength band after irradiating the test specimen O. In other words, when the incident beam IL is the fluorescence beam FLi, it is the case where the fluorescence beam FLi enters the second reflective optical film element 142. According to an embodiment of the disclosure, as shown in FIG. 2, the detection device 100 further includes a second housing HS2 to form a second darkroom for accommodating the second reflective optical film element 142 and the light-detecting component 130, so as to isolate external noise light and to facilitate fluorescence detection. The second housing HS2 has an inlet IN for the fluorescence beam FLi to pass through.

Similarly, as shown in FIGS. 2 and 4B, since the position of the test specimen O, the incident direction of the fluorescence beam FLi, and the positions of the second reflective optical film element 142 and the light-detecting component 130 are all fixed, a normal direction N2 of the second reflective optical film element 142 and, a second incident angle α2 between the fluorescence beam FLi and the normal direction N2 will also be kept at a fixed value. Therefore, as long as the inlet IN of the second housing HS2 is disposed as a small hole on the transmission path of the fluorescence beam FLi, the fluorescence beam FLi may pass through the inlet IN and is transmitted to the second reflective optical film element 142, so as to block ambient light, thereby further filtering out the influence of noise light. Further, when the fluorescence beam FLi passes through the second reflective optical film element 142, the depth distance dx of the resonant cavity of each filter unit FU of the second reflective optical film element 142 may be controlled to form the fluorescence beam FLo whose dominant wavelength falls within the detection wavelength band. The detection wavelength band is a wavelength band in which the characteristics of the fluorescence beam FL are more prominent. Although FIGS. 2, 4A, and 4B include the first dark room and the second dark room, according to another embodiment of the disclosure, the detection device 100 provides at least one dark room on one of the light-emitting component 110 and the light-detecting component 130 to block each other, so that only the light paths of the fluorescence channel communicate therebetween, so as to reduce the noise light received by the light-detecting component 130 and facilitate fluorescence detection. According to yet another embodiment of the disclosure, the fluorescence channel of the detection device 100 from the light-emitting component 110 to the light-detecting component 130 is disposed in at least one dark room to isolate external noise light. According to yet another embodiment of the disclosure, the fluorescence channel of the detection device 100 from the light-emitting component 110 to the light-detecting component 130 passes through at least two dark rooms to reduce external noise light.

Moreover, as shown in FIG. 2, the light-detecting component 130 is located on the transmission path of the fluorescence beam FLo for receiving the fluorescence beam FLo. For example, the light-detecting component 130 is a photoelectric sensor capable of detecting light intensity, and may be a photodiode. Specifically, the light-detecting component 130 is used for receiving a part of the fluorescence beam FLo whose dominant wavelength falls within the detection wavelength band.

On the other hand, as shown in FIG. 1, in the embodiment, the detection device 100 further includes the control unit 150. For example, the control unit 150 may be a microcontroller or a central processing unit, which includes a memory, an input controller, and an output controller. According to an embodiment of the disclosure, the control unit 150 may perform a program to control the configuration of the light-emitting wavelength band of the light-emitting component 110 and control the switching-on and switching-off of the light-emitting component 110. According to another embodiment of the disclosure, the control unit 150 may control the light-detecting component 130 to adjust the detected light intensity. For example, when the light-detecting component 130 has different sensing intensities for different wavelengths of light, the control unit 150 may be used for offset adjustment of the sensing intensities.

According to another embodiment of the disclosure, the control unit 150 may control the depth distance dx of the resonant cavity of the filter unit FU through which the excitation beam ELi or the fluorescence beam FLi passes, of the first optical film element 141 and/or the second optical film element 142 of the at least one reflective optical film element 140. More specifically, the control unit 150 may adjust the size of the depth distance dx of the resonant cavity of the filter unit FU of the at least one reflective optical film element 140 to further adjust the dominant wavelength band of the excitation beam ELo and/or the fluorescence beam FLo, so that the dominant wavelength of the excitation beam ELo may fall within the excitation wavelength band and/or the dominant wavelength of the fluorescence beam FLo may fall within the detection wavelength band.

The following will further explain how the control unit 150 performs the detection method in FIG. 3G Please refer to FIG. 3G In the embodiment, the detection method in FIG. 3G may be, for example, performed by the detection device 100 shown in FIGS. 1 and 2.

First, Step S110 is performed. The control unit 150 turns on the light-emitting component 110. Specifically, as shown in FIG. 2, in Step S110, the excitation beam ELi provided by the light-emitting component 110 may be collimated into a parallel beam by passing through a collimating lens CL1.

Next, Step S120 is performed. The control unit 150 controls the depth distance dx of the resonant cavity of the filter unit FU of the first reflective optical film element 141 to be a first depth distance according to the excitation wavelength band, so that the test specimen receives the excitation beam ELo whose dominant wavelength falls within the excitation wavelength band to generate the fluorescence beam FLi. More specifically, as shown in FIGS. 2 and 3B, when the excitation beam ELi enters the first reflective optical film element 141, the control unit 150 controls the depth distance dx of the resonant cavity of the filter unit FU of the first reflective optical film element 141 to be the first depth distance, and the value of the first depth distance corresponds to the value of the excitation wavelength band. Therefore, the resonant cavity reflects the excitation beam ELo whose dominant wavelength falls within the excitation wavelength band, which is received by the test specimen O to generate the fluorescence beam FLi.

According to an embodiment of the disclosure, the setting value of the excitation wavelength band may be between 400 nm and 700 nm to conform to the specification requirements of various fluorescent reagents. Listed as follows are the rated absorption excitation wavelengths (peak values of excitation wavelengths) of several commercially available fluorescent reagents and the corresponding rated fluorescence wavelengths (peak values of fluorescence wavelengths) generated: the excitation wavelength of green light (FAM) is 494 nm, which corresponds to the fluorescence wavelength of 520 nm; the excitation wavelength of yellow light (Cy3) is 547 nm, which corresponds to the fluorescence wavelength of 563 nm; the excitation wavelength of orange light (ROX) is 575 nm, which corresponds to the fluorescence wavelength of 602 nm; and the excitation wavelength of red light (Cy5) is 646 nm, which corresponds to the fluorescence wavelength of 662 nm. The so-called rated excitation wavelength (peak value of excitation wavelength) of a fluorescent reagent means that the fluorescent reagent reactant has fluorescent effects on all excitation beams in a certain excitation wavelength band, but has the best fluorescent effect on the rated excitation wavelength in the excitation wavelength band. In other words, the fluorescent reagent reactant has a fluorescent effect on the excitation beam near the rated excitation wavelength (that is, the excitation wavelength band), but the fluorescent effect on the rated excitation wavelength is the best. Moreover, when the excitation wavelength band is the range covered by the excitation wavelength band, the fluorescent reagent may be applied to the detection device 100, and the depth distance dx of the first reflective optical film element 141 is controlled by the detection device 100 through the control unit 150, thereby enabling the excitation beam ELo to excite the test specimen O to generate a better fluorescence generation effect.

Similarly, the so-called rated fluorescence wavelength (peak value of fluorescence wavelength) of a fluorescent reagent means that the fluorescence generated by the fluorescent reagent reactant with respect to the excitation beam will fall within a certain fluorescence wavelength band, but when the reactant is irradiated with light of the rated excitation wavelength, the fluorescence wavelength generated will fall near the rated fluorescence wavelength (that is, the fluorescence wavelength band), but the rated fluorescence wavelength has the best fluorescence generation effect. In addition, when the fluorescence wavelength band is the wavelength band covered by the detection wavelength band, the fluorescent reagent may be applied to the detection device 100. The depth distance dx of the second reflective optical film element 142 is controlled by the detection device 100 through the control unit 150, thereby purifying the color purity of the fluorescence beam FLo to purify the characteristics of the fluorescence beam FLo.

According to an embodiment of the disclosure, the excitation wavelength band may be within a range of 40 nm including the rated excitation wavelength. According to another embodiment of the disclosure, the excitation wavelength band may be within a range of 20 nm including the rated excitation wavelength. According to yet another embodiment of the disclosure, the excitation wavelength band may be within a range of 10 nm including the rated excitation wavelength. According to yet another embodiment of the disclosure, the excitation wavelength band may be within a range of 6 nm including the rated excitation wavelength. In addition, according to an embodiment of the disclosure, the excitation wavelength band is centered on the rated excitation wavelength and its range is to increase or decrease by a certain wavelength from the centered wavelength, for example, to increase or decrease by 20 nm, 10 nm, 5 nm, or 3 nm. The following explanation is provided by taking the commercially available green light (FAM) mentioned above as an example, which has the rated excitation wavelength of 494 nm and corresponds to the rated fluorescence wavelength of 520 nm. The excitation wavelength band may be within a range of 40 nm including the rated excitation wavelength of 494 nm (for example, within a range of 460 nm to 500 nm or a range of 470 nm to 510 nm), within a range of 20 nm including 494 nm (for example, within a range of 480 nm to 500 nm or a range of 490 nm to 510 nm), within a range of 10 nm including 494 nm (for example, within a range of 490 nm to 500 nm), or within a range of 6 nm including 494 nm (for example, within a range of 490 nm to 496 nm). Alternatively, the excitation wavelength band is centered on the rated excitation wavelength of 494 nm, and its range is to increase or decrease by a certain wavelength from the centered wavelength, for example, within a range of increasing or decreasing by 20 nm (that is, within a range of 474 nm to 514 nm), within a range of increasing or decreasing by 10 nm (that is, within a range of 484 nm to 504 nm), within a range of increasing or decreasing by 5 nm (that is, within a range of 489 nm to 499 nm), or within a range of increasing or decreasing by 3 nm (that is, within a range of 491 nm to 497 nm).

Moreover, when the excitation beam ELo is required to have a specific dominant wavelength, the first depth distance may be further limited. For example, when the dominant wavelength (that is, excitation wavelength) of the excitation beam ELo is required to be around 494 nm, the first depth distance may be controlled to a value corresponding to 494 nm to achieve the objective. As another example, when the dominant wavelength (that is, excitation wavelength) of the excitation beam ELo is required to be about 547 nm, the first depth distance may be controlled to another value corresponding to 547 nm to achieve the aim, and so on. In this way, the required excitation beam ELo may be obtained by adjusting the size of the first depth distance. Moreover, according to an embodiment of the disclosure, the first depth distance of the resonant cavity of the filter unit FU of the first reflective optical film element 141 may be adjusted to switch between the excitation wavelengths of two different colors of light, such as switching from green to yellow, yellow to orange, or orange to red. According to another embodiment of the disclosure, the size of the first depth distance of the resonant cavity of the filter unit FU may be adjusted to switch among the excitation wavelengths of three different colors of light, such as green, yellow, and orange, or yellow, orange, and red. According to another embodiment of the disclosure, the size of the first depth distance of the resonant cavity of the filter unit FU may be adjusted to switch among the excitation wavelengths of four or more different colors of light, such as green, yellow, orange, and red.

In this way, the control unit 150 may configure the value of the first depth distance according to the suitable wavelength band of the excitation beam ELo required by the type of fluorescent reagent in the test specimen O, so as to effectively form the required fluorescence beam FLi. It is not required to dispose various different filter modules constituted by bandpass filters and/or various different fluorescence channels as in the prior art. The control unit 150 only needs to adjust the first depth distance of the first reflective optical film element 141 to support the detection of multiple different types of fluorescent reagents, so that the equipment can be easily updated and expanded. In addition, during the detection of multiple different types of fluorescent reagents, since the excitation beam ELo required by different test specimens O may share the same light path or fluorescence channel, the light path can also be simplified and the complexity of production, assembly, maintenance, and adjustment can be reduced, so as to reduce the product costs and improve the production quality.

Similarly, since the range of dominant emission spectrum of the fluorescence beam FLi generated by the test specimen O varies with different types of fluorescent reagents, the detection device 100 may also perform Step S130 through the provision of the second reflective optical film element 142 located between the accommodating frame 120 and the light-detecting component 130, where the depth distance dx of the resonant cavity of the filter unit FU of the second reflective optical film element 142 is controlled to be the second depth distance according to the detection wavelength band, thereby filtering out the signal of noise light outside a specific wavelength band, and purifying the color purity of the fluorescence beam to purify the characteristics of the fluorescence beam, so as to improve the detection accuracy.

According to an embodiment of the disclosure, similar to the principle above for controlling the first reflective optical film element 141, as shown in FIGS. 2 and 3B, when the fluorescence beam FLi enters the second reflective optical film element 142, the control unit 150 controls the depth distance dx of the resonant cavity of the filter unit FU of the second reflective optical film element 142 to be the second depth distance, and the value of the second depth distance corresponds to the value of the detection wavelength band.

According to an embodiment of the disclosure, the value of the detection wavelength band may be between 450 nm and 730 nm to conform to the specification requirements of various fluorescent reagents. Please refer to examples of the rated absorption excitation wavelengths of the commercially available fluorescent reagents and the corresponding rated fluorescence wavelengths generated mentioned above. In addition, when the wavelength band (that is, a certain fluorescence wavelength band) near the rated fluorescence wavelength corresponding to the specifications of different fluorescent reagents is the wavelength band covered by the detection wavelength band, the fluorescent reagent may be applied to the detection device 100. The detection device 100 controls the depth distance dx of the second reflective optical film element 142 through the control unit 150, thereby purifying the color purity of the fluorescence beam FLo to purify the characteristics of the fluorescence beam FLo.

Furthermore, according to an embodiment of the disclosure, the fluorescence wavelength band may be within a range of 40 nm including the rated fluorescence wavelength. According to another embodiment of the disclosure, the fluorescence wavelength band may be within a range of 20 nm including the rated fluorescence wavelength. According to yet another embodiment of the disclosure, the fluorescence wavelength band may be within a range of 10 nm including the rated fluorescence wavelength. According to yet another embodiment of the disclosure, the fluorescence wavelength band may be within a range of 6 nm including the rated fluorescence wavelength. In addition, according to an embodiment of the disclosure, the fluorescence wavelength band is centered on the rated fluorescence wavelength, and its range is to increase or decrease by a specific wavelength from the centered wavelength, for example, to increase or decrease by 20 nm, 10 nm, 5 nm, or 3 nm. The following explanation is provided by taking the commercially available green light (FAM) mentioned above as an example, which has the rated excitation wavelength of 494 nm and corresponds to the rated fluorescence wavelength of 520 nm. The fluorescence wavelength band may within a range of 40 nm including the rated fluorescence wavelength of 520 nm (for example, within a range of 485 nm to 525 nm or a range of 495 nm to 535 nm), within a range of 20 nm including 520 nm (for example, within a range of 505 nm to 525 nm or a range of 515 nm to 535 nm), within a range of 10 nm including 520 nm (for example, within a range of 515 nm to 525 nm), or within a range of 6 nm including 520 nm (for example, within a range of 518 nm to 524 nm). Alternatively, the fluorescence wavelength band is centered on the rated fluorescence wavelength of 520 nm, and its range is to increase or decrease by a specific wavelength from the centered wavelength, for example, within a range of increasing or decreasing by 20 nm (that is, within a range of 500 nm to 540 nm), within a range of increasing or decreasing by 10 nm (that is, within a range of 510 nm to 530 nm), within a range of increasing or decreasing by 5 nm (that is, within a range of 515 nm to 525 nm), or within a range of increasing or decreasing by 3 nm (that is, within a range of 517 nm to 523 nm).

Moreover, when the fluorescence beam FLo is required to have a specific dominant wavelength, the second depth distance may be further limited. For example, when the dominant wavelength (that is, detection wavelength) of the fluorescence beam FLo is required to be around 520 nm, the second depth distance may be controlled to a value corresponding to 520 nm to achieve the objective. As another example, when the dominant wavelength (that is, detection wavelength) of the fluorescence beam FLo is required to be around 573 nm, the second depth distance may be controlled to another value corresponding to 573 nm to achieve the aim, and so on. In this way, the required fluorescence beam FLo may be obtained by adjusting the size of the second depth distance. Furthermore, the absorption excitation wavelengths of the commercially available fluorescent reagents and the corresponding fluorescence wavelengths generated are as described above. According to an embodiment of the disclosure, the second depth distance of the resonant cavity of the filter unit FU of the second reflective optical film element 142 may be adjusted to switch between the fluorescence wavelengths of two, three, four, or more different colors of light, similar to the case where the first depth distance of the resonant cavity the filter unit FU of the first reflective optical film element 141 is adjusted.

Next, referring to FIGS. 2 and 3G the control unit 150 may perform Step S140 to detect the light intensity of the fluorescence beam FLo whose dominant wavelength falls within the detection wavelength band, which light intensity is converted into electrical signals for subsequent analysis.

According to an embodiment of the disclosure, the control unit 150 may configure the value of the second depth distance according to the wavelength band of the dominant emission spectrum of the type of fluorescent reagent in the test specimen O, so as filter out the signal of noise light outside the specific wavelength band and to purify the characteristics of the fluorescence beam FLo. It is not required to dispose a filter module constituted by bandpass filters. The control unit 150 only needs to adjust the second depth distance of the second reflective optical film element 142 to support the detection of multiple different types of fluorescent reagents, so that the equipment may be easily updated and expanded. In addition, during the detection of multiple different fluorescent reagent types, since the fluorescence beam FLo formed by different test specimens O may share the same light path, the light path can also be simplified and the complexity of production and assembly can be reduced, so as to reduce the product costs and improve the production quality.

It is worth noting that although it is exemplified in the foregoing embodiments that the approach for the control unit 150 to control the first reflective optical film element 141 and the second reflective optical film element 142 of the at least one reflective optical film element 140 is to adjust the size of the depth distance dx of the resonant cavity of the filter unit FU of the at least one reflective optical film element 140, the disclosure, however, is not limited thereto. In the following, other embodiments will be exemplified for illustration.

Figure 5A:
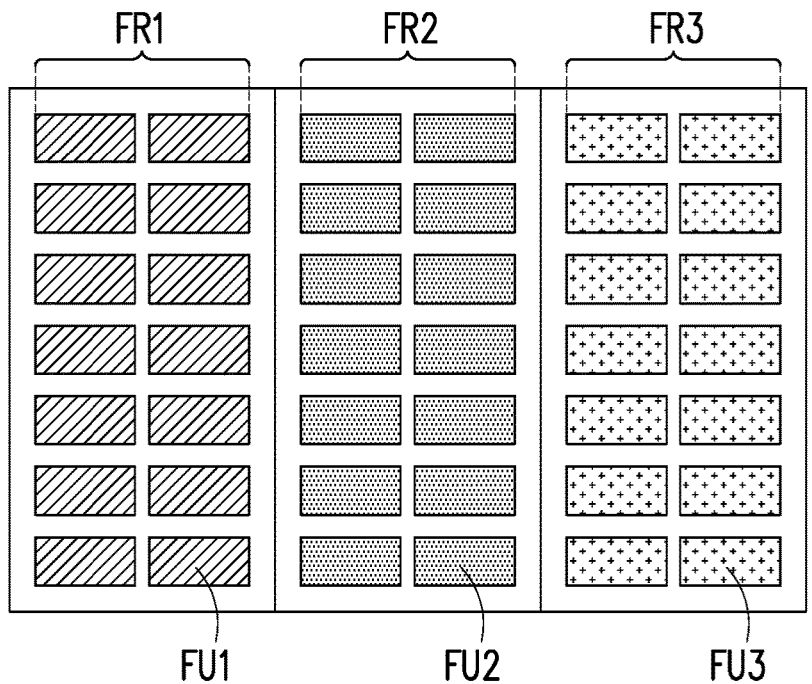
FIG. 5A is a schematic front view of another embodiment of the reflective optical film element shown in FIG. 2.
Figure 5B:
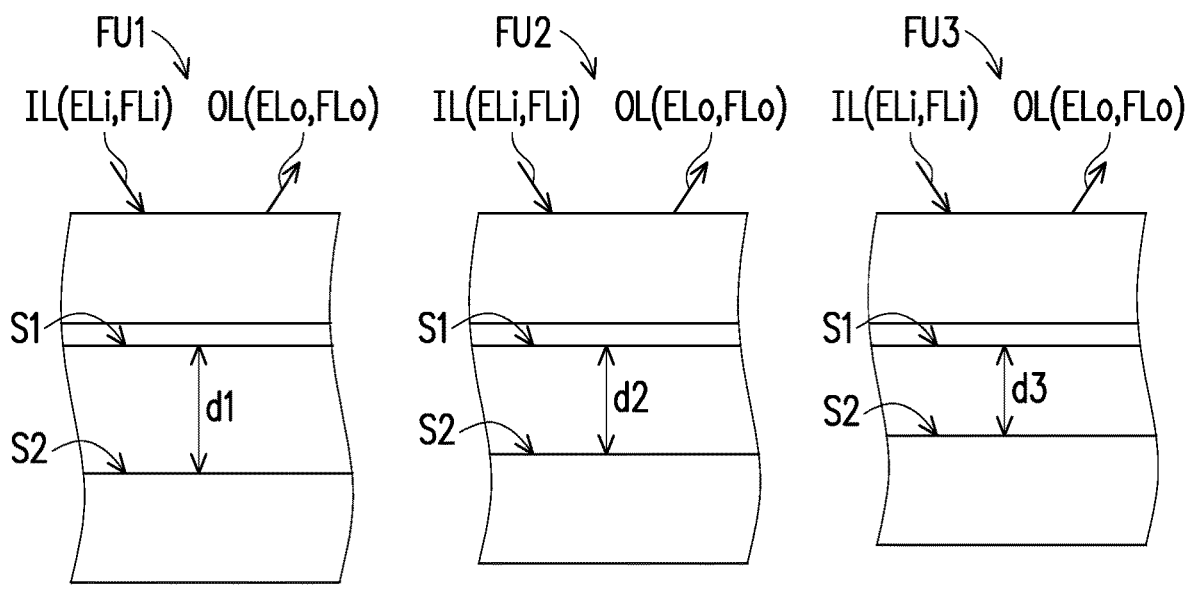
FIG. 5B is a schematic view of an embodiment of different reflective filter units of the reflective optical film element shown in FIG. 5A.
Figure 5C:
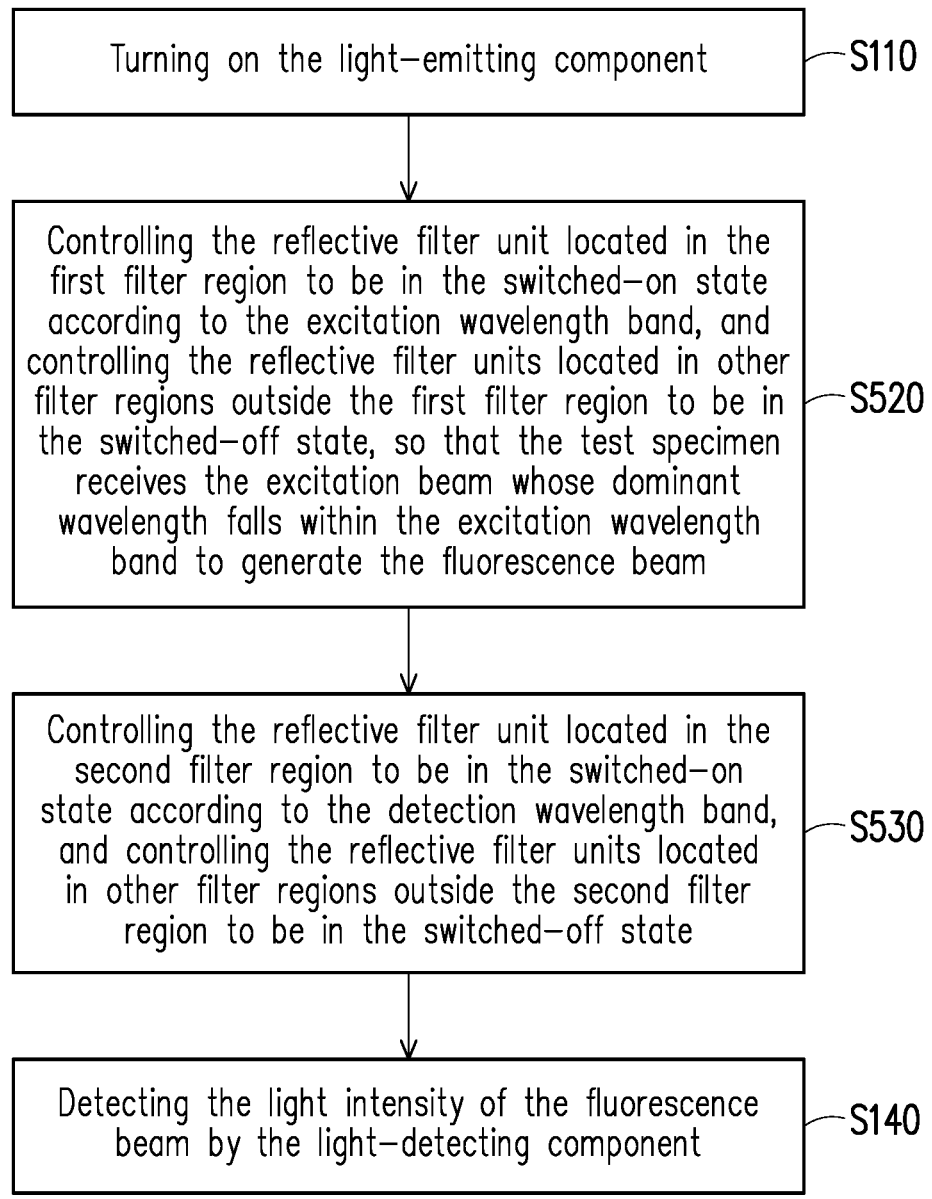
FIG. 5C is a flowchart of a detection method when the reflective optical film element shown in FIG. 5A is used.

FIG. 5A is a schematic front view of another embodiment of the reflective optical film element shown in FIG. 2. FIG. 5B is a schematic view of an embodiment of different reflective filter units FU1, FU2, and FU3 of the reflective optical film element shown in FIG. 5A. FIG. 5C is a flowchart of a detection method when the reflective optical film element shown in FIG. 5A is used. Referring to FIGS. 5A to 5C, a reflective optical film element 540 is similar to the reflective optical film element 140 of FIG. 1, and the main differences are as follows. As shown in FIG. 5A, in the embodiment, a first reflective optical film element 541 and a second reflective optical film element 542 of at least one reflective optical film element 540 each include multiple filter region FR1, filter region FR2, and filter region FR3. The filter region FR1, the filter region FR2, and the filter region FR3 include therein the reflective filter unit FU1, reflective filter unit FU2, and reflective filter unit FU3, respectively. Actuation depth distance d1, actuation depth distance d2, and actuation depth distance d3 of the resonant cavity of the respective reflective filter unit FU1, reflective filter unit FU2, and reflective filter unit FU3 in the filter region FR1, the filter region FR2, and the filter region FR3, respectively, are fixed values, which are the depth distances when the reflective filter units are in the switched-on state (not in the switched-off state) to perform filtered reflection. The actuation depth distances d1 (or actuation depth distances d2 or actuation depth distances d3) of the resonant cavities of the reflective filter unit FU1 (or reflective filter unit FU2 or reflective filter unit FU3) located in the same filter region FR1 (or filter region FR2 or filter region FR3) are the same as each other. The actuation depth distance d1, the actuation depth distance d2, and the actuation depth distance d3 of the resonant cavities of the reflective filter unit FU1, the reflective filter unit FU2, and the reflective filter unit FU3, respectively, located in different filter region FR1, filter region FR2, and filter region FR3, respectively, are different from each other. Please note that since FIG. 5A is a schematic view of the reflective optical film element 540, the first reflective optical film element 541 and the second reflective optical film element 542 are respectively exemplified. However, the actuation depth distance d1 (or actuation depth distance d2 or actuation depth distance d3) of the first reflective optical film element 541 and the actuation depth distance d1 (or actuation depth distance d2 or actuation depth distance d3) of the second reflective optical film element 542 do not need to be the same and may be different, and the two are often different as the absorption wavelength of a fluorescent reagent is normally shorter and the emission fluorescence wavelength is longer. Therefore, when the components of two reflective filter units of the same specifications are used, different actuation depth distance settings are required to obtain the filter effect of different wavelengths. For example, as described above, the green light (FAM) has the excitation wavelength of 494 nm and the fluorescence wavelength of 520 nm, which respectively correspond to the filter region FR1 of the first reflective optical film element 541 and the filter region FR1 of the second reflective optical film element 542. As such, the actuation depth distance d1 (first depth distance) of the filter region FR1 of the first reflective optical film element 541 and the actuation depth distance d1 (second depth distance) of the filter region FR1 of the second reflective optical film element 542 of the components of the same specifications are not the same.

Moreover, the control unit 150 may also control the switching-on and switching-off of the reflective filter unit FU1, the reflective filter unit FU2, and the reflective filter unit FU3 located in different filter regions in the at least one reflective optical film element 540 to further adjust the dominant wavelength band of the excitation beam ELo and the fluorescence beam FLo, so that the dominant wavelength of the excitation beam ELo may fall within the excitation wavelength band and/or the dominant wavelength of the fluorescence beam FLo may fall within the detection wavelength band. The following will further explain how the control unit 150 performs the detection method in FIG. 5C. Please refer to FIG. 5C. In the embodiment, the detection method in FIG. 5C may be performed by, for example, the detection device 100 of FIGS. 1 and 2.

First, Step S110 is performed. The manner of performing Step S110 is the same as the control method in FIG. 3G so there will be no reiteration here.

Next, Step S520 is performed. The control unit 150 controls the reflective filter unit located in the first filter region to be in the switched-on state according to the excitation wavelength band, and controls the reflective filter units located in other filter regions outside the first filter region to be in the switched-off state, so that the test specimen receives the excitation beam ELo whose dominant wavelength falls within the excitation wavelength band to generate the fluorescence beam FLi. The depth distance of the resonant cavity of the reflective filter unit located in the first filter region is the first depth distance as the actuation depth distance.

According to an embodiment of the disclosure, the manner in which the control unit 150 controls the reflective filter unit FU1 (or reflective filter unit FU2 or reflective filter unit FU3) of the first reflective optical film element 541 to be in the switched-on state is by, for example, applying static electricity to the resonant cavity of the reflective filter unit FU1 (or reflective filter unit FU2 or reflective filter unit FU3). At this time, the reflective film for forming the first interface S1 and the second interface S2 of the reflective filter unit FU1 (or reflective filter unit FU2 or reflective filter unit FU3) will collapse, causing the depth distance of the resonant cavity of the reflective filter units FU1 (or reflective filter units FU2 or reflective filter units FU3) in the switched-off state to become very narrow. As such, the wavelength of the outgoing beam OL that can pass through the reflective filter units HA (or reflective filter units FU2 or reflective filter units FU3) in the switched-off state becomes very short, which may fall outside the excitation wavelength band or detection wavelength band, and the intensity will also be attenuated. In other words, when the incident beam IL enters the reflective filter units FU1 (or reflective filter units FU2 and reflective filter units FU3) of the first reflective optical film element 541 in the switched-off state, the incident beam IL may be filtered out. In this way, when the reflective filter unit located in a certain filter region (for example, the first filter region) in the first reflective optical film element 541 is configured to the switched-on state, only the excitation beam of the reflective filter unit passing through the one filter region (that is, the first filter region) can become the outgoing beam OL of the first reflective optical film element 541. Since the actuation depth distance of the resonant cavity of the filter unit located in the first filter region of the first reflective optical film element 541 of the embodiment is the first depth distance, and the value of the first depth distance corresponds to the value of the excitation wavelength band, the dominant wavelength of the excitation beam ELo may fall within the excitation wavelength band.

More specifically, in the embodiment, the control unit 150 can select one of the filter region FR1, the filter region FR2, and the filter region FR3 of the first reflective optical film element 541 to be the first reflective filter region based on the excitation wavelength band, that is, one of the actuation depth distance d1, the actuation depth distance d2, and the actuation depth distance d3 is selected as the first depth distance. In this way, the control unit 150 may determine the first depth distance through the selection of the filter region FR1, the filter region FR2, and the filter region FR3 of the first reflective optical film element 541, so that the dominant wavelength of the excitation beam ELo may fall within the excitation wavelength band.

According to an embodiment of the disclosure, the actuation depth distance d1 of the filter region FR1 of the first reflective optical film element 541 is greater than the actuation depth distance d2 of the filter region FR2 thereof and the actuation depth distance d3 of the filter region FR3 thereof. Therefore, when the value of the excitation wavelength band is greater (i.e., of higher wavelengths), the filter region FR1 having the greater actuation depth distance d1 may be selected as the first filter region. Conversely, when the value of the required excitation wavelength band is smaller (i.e., of lower wavelengths), the filter region FR2 having the smaller actuation depth distance d2 or the filter region FR3 having the actuation depth distance d3 may be selected as the first filter region. According to another embodiment of the disclosure, the actuation depth distance d3 of the filter region FR3 is smaller than the actuation depth distance d1 of the filter region FR1 and the actuation depth distance d2 of the filter region FR2. Therefore, when the value of the required excitation wavelength band is smaller (i.e., of lower wavelengths), the filter region FR3 having the smaller actuation depth distance d3 may be selected as the first filter region. Conversely, when the value of the required excitation wavelength band is greater (i.e., of higher wavelengths), the filter region FR1 having the greater actuation depth distance d1 or the filter region FR2 having the actuation depth distance d2 may be selected as the first filter region. In this way, the required excitation beam ELo may be obtained by selecting the suitable filter region as the first filter region.

Next, Step S530 is performed. According to an embodiment of the disclosure, the control unit 150 controls the reflective filter unit located in the second filter region of the second reflective optical film element 542 to be in the switched-on state according to the detection wavelength band, and controls the reflective filter units located in other filter regions outside the second filter region to be in the switched-off state. The depth distance of the resonant cavity of the reflective filter unit located in the second filter region is the second depth distance.

Similarly, since the reflective filter units located in other filter regions outside the second filter region are in the switched-off state, only the fluorescence beam FLo passing through the reflective filter unit in the second filter region can become the outgoing beam OL of the second reflective optical film 542. Moreover, since the depth distance of the resonant cavity of the reflective filter unit located in the second filter region is the second depth distance, and the value of the second depth distance corresponds to the value of the detection wavelength band, the dominant wavelength of the fluorescence beam FLo may fall within the detection wavelength band.

According to an embodiment of the disclosure, in the embodiment, the control unit 150 may also select one of the filter region FR1, the filter region FR2, and the filter region FR3 as the second filter region based on the detection wavelength band, that is, one of the actuation depth distance d1, the actuation depth distance d2, and the actuation depth distance d3 is selected as the second depth distance. In this way, the control unit 150 may also determine the second depth distance through the selection of the filter region, thereby enabling the dominant wavelength of the fluorescence beam FLo to fall within the detection wavelength band. In this way, the required fluorescence beam FLo may be obtained by selecting the suitable actuation depth distance. According to another embodiment of the disclosure, when the suitable excitation spectrum of a first fluorescent reagent of a first test specimen falls within a first excitation wavelength band (suitable excitation wavelength band of the first fluorescent reagent) and the dominant wavelength of the fluorescence emitted thereby falls within a first detection wavelength band (suitable detection wavelength band of the first fluorescent reagent), the reflective filter unit FU1 of the filter region FR1 of the first reflective optical film element 541 may be configured to have at least a part of the dominant wavelength thereof to fall within the first excitation wavelength band, and the reflective filter unit FU1 of the filter region FR1 of the second light reflective film element 542 may be configured to have at least a part of the dominant wavelength thereof to fall within the first detection wavelength band. When the suitable excitation spectrum of a second fluorescent reagent of a second test specimen falls within a second excitation wavelength band (suitable excitation wavelength band of the second fluorescent reagent) and the dominant wavelength of the fluorescence emitted thereby falls within a second detection wavelength band (suitable detection wavelength band of the second fluorescent reagent), the reflective filter unit FU2 of the filter region FR2 of the first reflective optical film element 541 may be configured to have at least a part of the dominant wavelength thereof to fall within the second excitation wavelength band, and the reflective filter unit FU2 of the filter region FR2 of the second reflective optical film element 542 may be configured to have at least a part of the dominant wavelength thereof to fall within the second detection wavelength band. When the suitable excitation spectrum of a third fluorescent reagent of a third test specimen falls within a third excitation wavelength band (suitable excitation wavelength band of the third fluorescent reagent) and the dominant wavelength of the fluorescence emitted thereby falls within a third detection wavelength band (suitable detection wavelength band of the third fluorescent reagent), the reflective filter unit FU3 of the filter region FR3 of the first reflective optical film element 541 may be configured to have at least a part of the dominant wavelength thereof to fall within the third excitation wavelength band, and the reflective filter unit FU3 of the filter region FR3 of the second reflective optical film element 542 may be configured to have at least a part of the dominant wavelength thereof to fall within the third detection wavelength band. The first fluorescent reagent, the second fluorescent reagent, and the third fluorescent reagent are different fluorescent reagents. According to yet another embodiment of the disclosure, the first excitation wavelength band (suitable excitation wavelength band of the first fluorescent reagent), the second excitation wavelength band (suitable excitation wavelength band of the second fluorescent reagent), and the third excitation wavelength band (suitable excitation wavelength band of the third fluorescent reagent), and the respective corresponding first detection wavelength band (suitable detection wavelength band of the first fluorescent reagent), second detection wavelength band (suitable detection wavelength band of the second fluorescent reagent), and third detection wavelength band (suitable detection wavelength band of the third fluorescent reagent) may be achieved by respectively disposing or configuring the depth distances of the resonant cavities of the reflective filter units thereof.

Next, please refer to FIGS. 2 and 5C, the control unit 150 may perform Step S140 to detect the light intensity of the fluorescence beam FLo whose dominant wavelength falls within the detection wavelength band and the light intensity is converted into electrical signals for subsequent analysis.

In addition, it is worth noting that although the filter regions and the reflective filter units contained therein, of the first reflective optical film element 541 and the second reflective optical film element 542 are described using the same drawing (FIG. 5A), the first reflective optical film element 541 and the second reflective optical film element 542 are two different elements. Therefore, the shapes, sizes, depth distances of resonant cavities, and arrangements of the filter region FR1, the filter region FR2, and the filter region FR3 of the first optical film element 541, and of the filter region FR1, the filter region FR2, and the filter region FR3 of the second optical film element 542, do not need to be the same. Also, the shapes, sizes, arrangements, depth distances of resonant cavities, and optical characteristics of the respective reflective filter unit FU1, reflective filter unit FU2, reflective filter unit FU3 thereof also do not need to be the same. Furthermore, as shown in FIG. 5B, although the number of the filter regions of the first reflective optical film element 541 and the second reflective optical film element 542 of the at least one reflective optical film element 540 is exemplified as three (3), the disclosure is not limited thereto. According to another embodiment of the disclosure, the number of the filter regions of the first reflective optical film element 541 and the second reflective optical film element 542 of the at least one reflective optical film element 540 and the reflective filter units contained therein may be two, four, five, six, or more. In other embodiments, the number of fluorescent reagent may be used to determine the number of the filter regions of the at least one reflective optical film element 540 and the reflective filter units contained therein, and the characteristics of the type of fluorescent reagent may be used to simultaneously adjust the setting value of the depth distance of each filter region, so as to conform to the actual product requirements.

When the first reflective optical film element 541 and/or the second reflective optical film element 542 of the reflective optical film element 540 are used in the detection device 100, the control unit 150 of the detection device 100 may also select the suitable filter region of the first reflective optical film element 541 and/or filter region of the second reflective optical film element 542 to be in the switched-on state according to the suitable wavelength band (that is, excitation wavelength band) of the excitation beam ELo required by the type of fluorescent reagent in the test specimen O or the range of the dominant emission spectrum (that is, detection wavelength band) of the fluorescence beam FLo generated by the test specimen O, thereby enabling the excitation beam ELi or the fluorescence beam FLi to pass through the filter region having the suitable depth distance, so as to form the required excitation beam ELo and/or fluorescence beam FLo. In this way, the detection device 100 can support the detection of multiple different types of fluorescent reagents, so there is no need to dispose a filter module constituted by bandpass filters, so that the equipment can be easily updated and expanded, thereby achieving the effects and advantages mentioned above of the detection device 100, which will not be reiterated here.

Although the detection device 100 according to the embodiment of FIGS. 1 and 2 includes the light-emitting component 110, the accommodating frame 120, the light-detecting component 130, and the at least one reflective optical film element 140, and the at least one reflective optical film element 140 includes the first reflective optical film element 141 and the second reflective optical film element 142, according to another embodiment of the disclosure, the at least one reflective optical film element 140 only includes one of the first reflective optical film element 141 or the second reflective optical film elements 142. According to an embodiment of the disclosure, in the embodiment that the at least one reflective optical film element 140 only includes the first reflective optical film element 141 but does not include the second reflective optical film element 142 (not shown), the detection can be correctly performed and the detection device still has the effect of improving the shortcomings of the prior art, as long as the quality of the fluorescence beam of the test specimen O is good enough, the light path design of the fluorescence channel is good enough, or there are other reasons enabling the light detected by the light-detecting component 130 to conform to the specifications. At this time, the fluorescence channel is constituted by each section of the light paths between the light-emitting component 110, the first reflective optical film element 141, the accommodating frame 120 (or the test specimen O thereof), and the light-detecting component 130. According to yet another embodiment of the disclosure, in the above-mentioned embodiment that the at least one reflective optical film element 140 only includes the first reflective optical film element 141 but does not include the second reflective optical film element 142 (not shown), a conventional bandpass filter (not shown) may be further included to take the place of the missing second reflective optical film element 142 in the embodiment of FIGS. 1 and 2 for filtering out the light outside the detection wavelength band, and such detection device also has the effect of improving the shortcomings of the prior art. At this time, the fluorescence channel is constituted by each section of the light paths between the light-emitting component 110, the first reflective optical film element 141, the accommodating frame 120 (or the test specimen O thereof), the bandpass filter (not shown), and the light-detecting component 130. According to an embodiment of the disclosure, in the embodiment that the at least one reflective optical film element 140 only includes the second reflective optical film element 142 but does not include the first reflective optical film element 141, the detection can be correctly performed and the detection device still has the effect of improving the shortcomings of the prior art, as long as the quality of the excitation beam of the light-emitting component 110 is good enough, the quality of the fluorescence beam of the test specimen O is good enough, the light path design of the fluorescence channel is good enough, or there are other reasons enabling the light detected by the light-detecting component 130 to conform to the specifications. At this time, the fluorescence channel is constituted by each section of the light paths between the light-emitting component 110, the accommodating frame 120 (or the test specimen O thereof), the second reflective optical film element 142, and the light-detecting component 130. According to yet another embodiment of the disclosure, in the above-mentioned embodiment that the at least one reflective optical film element 140 only includes the second reflective optical film element 142 but does not include the first reflective optical film element 141 (not shown), a conventional bandpass filter (not shown) may also be included to take the place of the missing first reflective optical film element 141 in the embodiment of FIGS. 1 and 2 for filtering out the light outside the excitation wavelength band, and such detection device also has the effect of improving the shortcomings of the prior art. At this time, the fluorescence channel is constituted by each section of the light paths between the light-emitting component 110, the bandpass filter (not shown), the accommodating frame 120 (or the test specimen O thereof), the second reflective optical film element 142, and the light-detecting component 130. Although the foregoing embodiments of the detection device 100 includes the at least one reflective optical film element 140, and the at least one reflective optical film element 140 includes the first reflective optical film element 141 and/or the second reflective optical film element 142, according to another embodiment of the disclosure, the detection device may also be established by respectively replacing one or more of the at least one reflective optical film element 140, the first reflective optical film element 141, and the second reflective optical film element 142 in the foregoing embodiment with the at least one reflective optical film element 540, the first reflective optical film element 541, and the second reflective optical film element 542.

In summary, the detection device of the disclosure can support the detection of multiple different types of fluorescent reagents by the configuring of the optical film elements. It is not required to dispose a filter module constituted by bandpass filters, and the equipment can be easily updated and expanded, although the using of bandpass filters is not prohibited. In addition, during the detection of multiple different types of fluorescent reagents, since the excitation beams (or the fluorescence beams formed therefrom) required by different test specimens may share the same light path and/or fluorescence channel, the light path can also be simplified and the complexity of production and assembly can be reduced, so as to reduce the product costs and improve the production quality.

Figure 6:
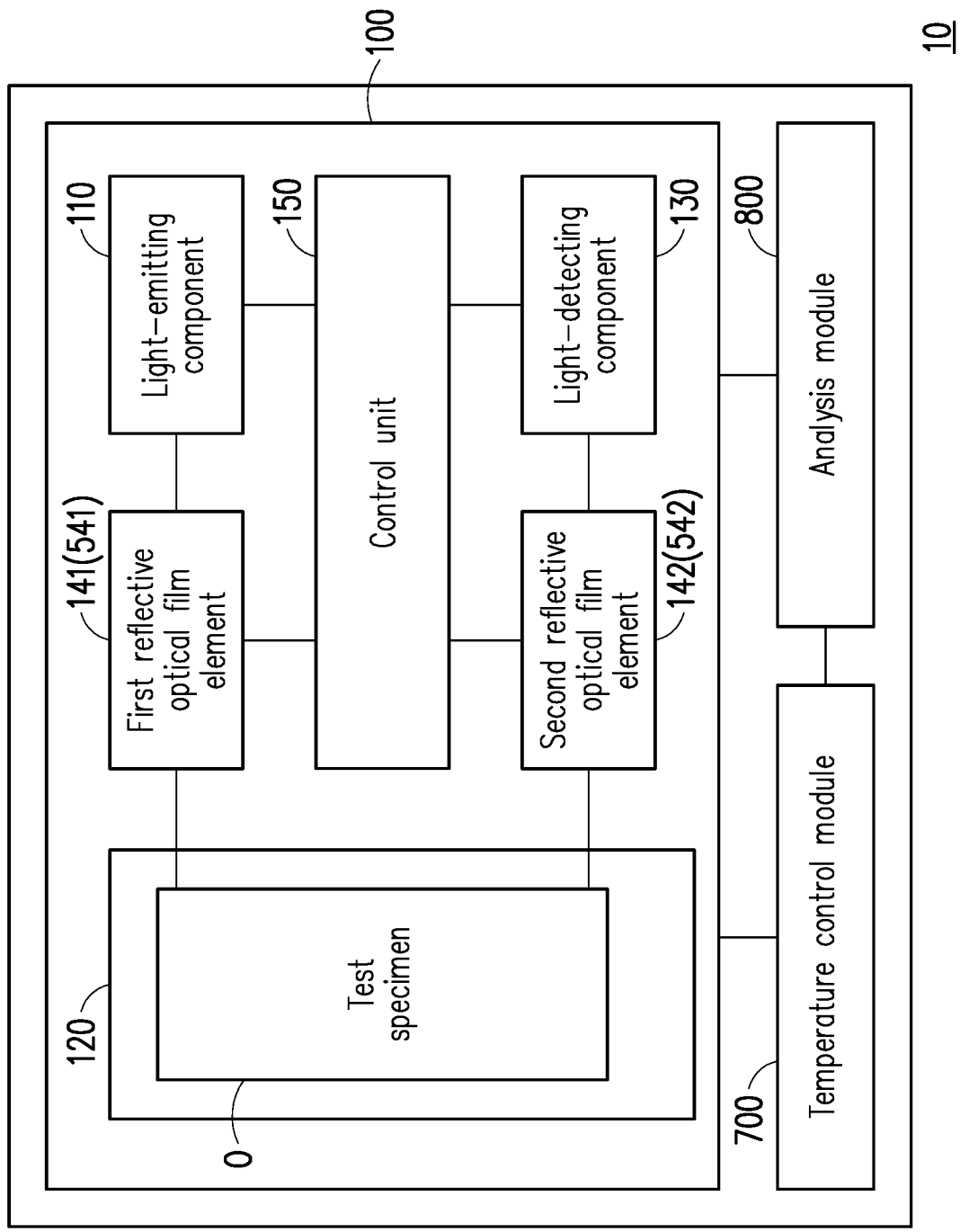
FIG. 6 is a block diagram of an application example of a detection device in a fluorescent real-time polymerase chain reaction (real-time PCR)/quantitative polymerase chain reaction (qPCR) system according to the disclosure.
Figure 7:
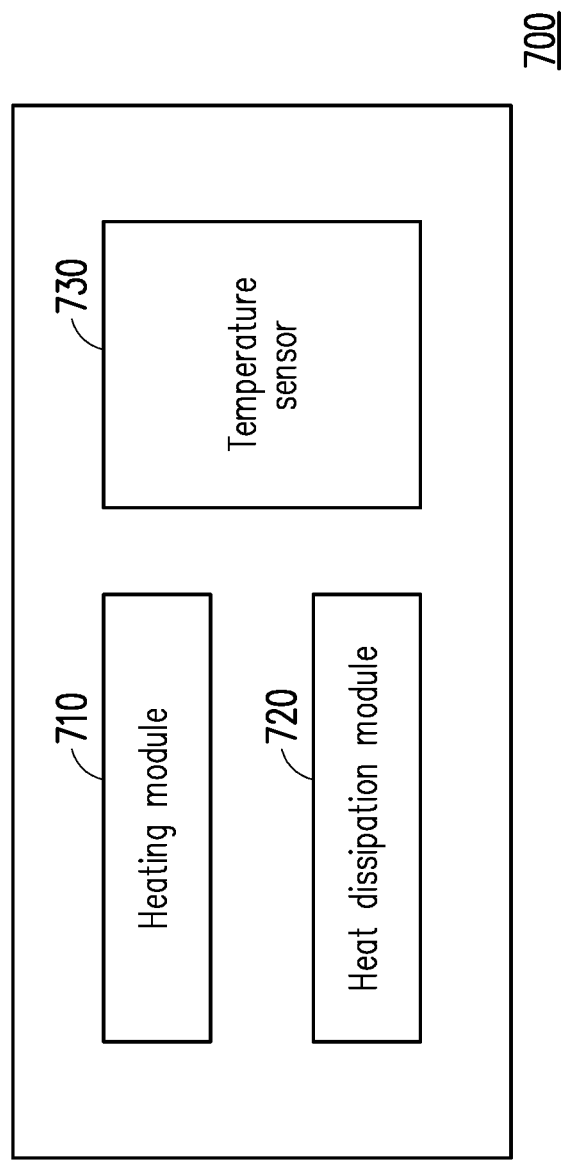
FIG. 7 is a block diagram of an embodiment of a system of a temperature control module shown in FIG. 6.

Please refer to FIG. 6, wherein a block diagram of an application example of a fluorescent real-time polymerase chain reaction (real-time PCR)/quantitative polymerase chain reaction (qPCR) system of a detection device according to the disclosure is illustrated. The detection device 100 of the disclosure may be applied to a fluorescent real-time PCR/qPCR system 10. The fluorescent real-time PCR/qPCR system 10 includes the detection device 100, a temperature control module 700, and an analysis module 800. According to an application example of the disclosure, as shown in FIG. 7, the temperature control module 700 includes a heating module 710 and a heat dissipation module 720, and generates the required thermal cycles under the control of the control unit, and controls the temperature of the test specimen, so that the amount of a target analyte in the test specimen is doubled after each thermal cycle, and the amount of the target analyte becomes 2 to the power of N times after N thermal cycles. According to an embodiment of the disclosure, the temperature control module 700 has a temperature sensor 730 for sensing a temperature in the system, such as the temperature of the accommodating frame 120 or the test specimen, and the temperature of the test specimen may be controlled through the accommodating frame 120. According to an embodiment of the disclosure, the temperature sensor 730 is connected to the accommodating frame 120 of the detection device 100 for sensing the temperature of the accommodating frame 120. According to another embodiment of the disclosure, the temperature sensor 730 is connected to the sleeve structure 121 of the accommodating frame 120 for sensing the temperature of the sleeve structure 121. The detection device 100 includes the light-emitting component 110, the light-detecting component 130, the at least one reflective optical film element 140 (540) disposed on the fluorescence channel between the light-emitting component 110 and the light-detecting component 130, and the control unit 150 coupled to the at least one reflective optical film element 140 (540) for controlling the wavelength band of the reflected light of the at least one reflective optical film element 140 (540). The details, operation methods, and various implementations have been described above, which will not be reiterated here. The analysis module 800 monitors, records, and quantitatively and/or qualitatively analyzes the temperature change and fluorescence change of the test specimen throughout the polymerase chain reaction process under the control of the control unit 150. According to an embodiment of the disclosure, the analysis module 800 uses an analysis software to perform analysis. According to an embodiment of the disclosure, the analysis module 800 analyzes the signal detected by the light-detecting component 130. Although the above application example of the detection device 100 according to the disclosure is illustrated using a fluorescent real-time PCR/qPCR system 10, the detection device 100 can be applied to fluorescent PCR systems for other types of polymerase chain reaction (PCR) application, rather than only the qPCR application.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A detection device, comprising:
a light-emitting component;
a light-detecting component;
at least one reflective optical film element, disposed on a fluorescence channel between the light-emitting component and the light-detecting component; and
a control unit, coupled to the at least one reflective optical film element, and to control a wavelength band of a reflected light of the at least one reflective optical film element,
wherein the fluorescence channel comprises an excitation beam light path for passing of an excitation beam and a fluorescence beam light path for passing of a fluorescence beam that is generated in response to the excitation beam, wherein each of the at least one reflective optical film element comprises one or more microelectromechanical systems (MEMS) reflective filter units, the MEMS reflective filter units each including an optical resonant cavity having a depth distance being controlled by the control unit to reflect light having a specific wavelength, and an accommodating frame having a plurality of sleeve structures to accommodate a plurality of test specimens, the sleeve structures each having an opening to receive the excitation beam whose dominant wavelength falls within an excitation wavelength band and having a hole to transmit the fluorescence beam whose dominant wavelength falls within a detection wavelength band.

2. The detection device according to claim 1, wherein the at least one reflective optical film element further comprises a first reflective optical film element, and the one or more MEMS reflective filter units with the depth distance of the resonant cavity being of a first depth distance is disposed on the first reflective optical film element to reflect an outgoing beam whose dominant wavelength falls within the excitation wavelength band and corresponds to the first depth distance.

3. The detection device according to claim 1, wherein the at least one reflective optical film element further comprises a second reflective optical film element, and the one or more MEMS reflective filter units with the depth distance of the resonant cavity being of a second depth distance is disposed on the second reflective optical film element to reflect an outgoing beam whose dominant wavelength falls within the detection wavelength band and corresponds to the second depth distance.

4. The detection device according to claim 1, wherein the at least one reflective optical film element comprises one or more filter regions, each of the one or more filter regions comprises the one or more MEMS reflective filter units, actuation depth distances of the resonant cavities of the one or more MEMS reflective filter units located in a same filter region are the same as each other, and actuation depth distances of the resonant cavities of the one or more MEMS reflective filter units located in different filter regions are different from each other.

5. The detection device according to claim 4, wherein the one or more filter regions comprise a first filter region, and the one or more MEMS reflective filter units located in the first filter region reflect light whose dominant wavelength falls within the excitation wavelength band.

6. The detection device according to claim 4, wherein the one or more filter regions comprise a second filter region, and a reflected light of the one or more MEMS reflective filter units located in the second filter region falls within the detection wavelength band under a control of the control unit.

* * * * *